US009720700B1

(12) United States Patent
Brown et al.

(10) Patent No.: US 9,720,700 B1
(45) Date of Patent: Aug. 1, 2017

(54) SECURE STORAGE DEVICES, WITH PHYSICAL INPUT DEVICE, FOR SECURE CONFIGURATION IN A CONFIGURATION-READY MODE

(71) Applicant: APRICORN, Poway, CA (US)

(72) Inventors: Paul Cameron Brown, San Diego, CA (US); Michael Lee McCandless, Poway, CA (US); Radha Savaram, Poway, CA (US); Robert Michael Davidson, Santee, CA (US)

(73) Assignee: APRICORN, Poway, CA (US)

( * ) Notice: Subject to any disclaimer, the term of this patent is extended or adjusted under 35 U.S.C. 154(b) by 0 days.

(21) Appl. No.: 15/286,465

(22) Filed: Oct. 5, 2016

(51) Int. Cl.
*G06F 9/00* (2006.01)
*G06F 9/24* (2006.01)
*G06F 15/177* (2006.01)
*G06F 9/44* (2006.01)
*G06F 21/31* (2013.01)
*H04L 9/08* (2006.01)
*G06F 12/14* (2006.01)
*G06F 13/40* (2006.01)

(52) U.S. Cl.
CPC ........ *G06F 9/4411* (2013.01); *G06F 12/1408* (2013.01); *G06F 13/4068* (2013.01); *G06F 21/31* (2013.01); *H04L 9/0891* (2013.01); *G06F 2212/402* (2013.01)

(58) Field of Classification Search
CPC ........ G06F 12/1408; G06F 2212/1052; G06F 21/31; G06F 13/4068; G06F 9/4411; G06F 2212/402; H04L 9/0891
See application file for complete search history.

(56) References Cited

U.S. PATENT DOCUMENTS

| 9,075,571 B2 * | 7/2015 | Bolotin ................. G06F 1/1632 |
| 9,081,911 B2 * | 7/2015 | Powers .................. G06F 21/57 |
| 2007/0106764 A1 | 5/2007 | Mansfield |
| 2009/0200371 A1 * | 8/2009 | Kean ...................... G06F 21/31 235/379 |

(Continued)

OTHER PUBLICATIONS

ThinkPad USB 3.0 Secure Hard Drive User Guide, Aug. 2013.*

(Continued)

*Primary Examiner* — Xuxing Chen
(74) *Attorney, Agent, or Firm* — McDermott Will & Emery LLP

(57) ABSTRACT

A secure storage device includes a physical key input device, a secure memory and a controller. The controller arbitrates access by a host to securely configure the device based on the device's mode of operation. The controller determines whether the device is in a configuration-ready mode based on information within the device. Only when the device is in the configuration-ready mode, the device may be configured by the host. When a device is in a non-configuration-ready mode, the device is prevented from being configured by the host, but the device can be set to the configuration-ready mode, for example, by nullifying configuration data (e.g., PINs), by creating new encryption key(s), and by setting the mode to the configuration-ready mode. A null PIN is unusable to unlock the device after being locked. A new encryption key is unusable to decrypt data previously stored in the device, making such data unrecoverable.

20 Claims, 14 Drawing Sheets

(56) References Cited

U.S. PATENT DOCUMENTS

2014/0245427 A1* 8/2014 Nagai .................... G06F 21/44
                                                    726/16

OTHER PUBLICATIONS

UKLA, Version 3.4 User Manual, 2014.
Remote Management Suite and Local Administrator, retrieved from web on Dec. 21, 2016, 4 pages.
User Manual DL3 Configurator v. 1.32.6 Windows Client, Feb. 2014.
DL3 Configurator and Encrypted External Hard Drive, retrieved from web on Dec. 21, 2016, 9 pages.

* cited by examiner

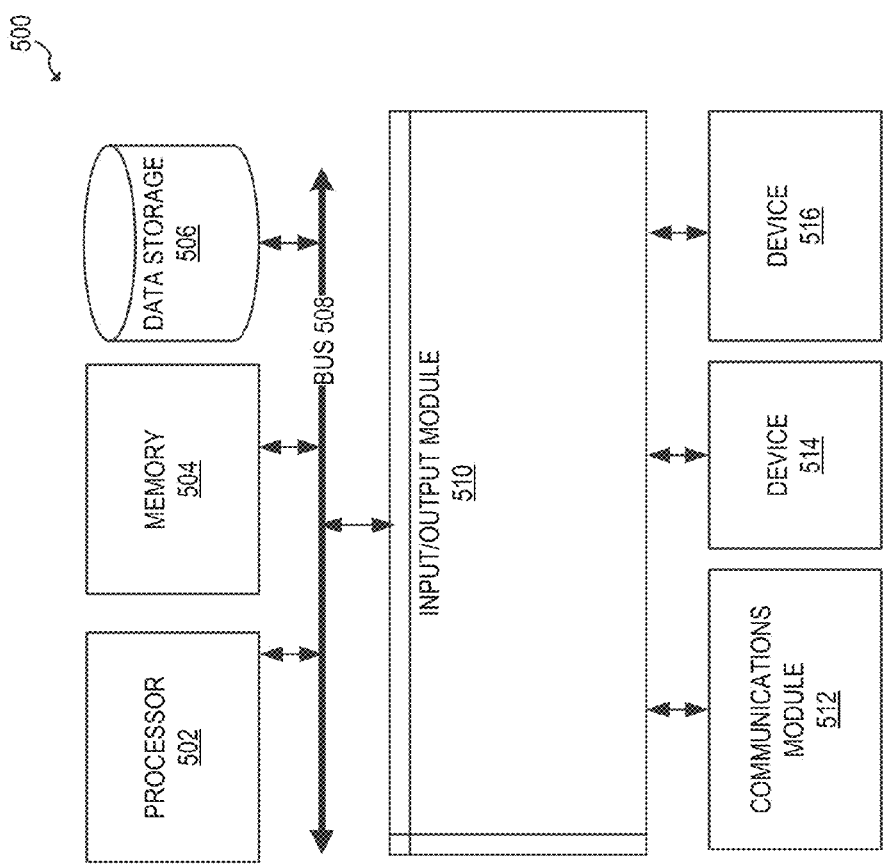

SECURE STORAGE DEVICES, WITH PHYSICAL INPUT DEVICE, FOR SECURE CONFIGURATION IN A CONFIGURATION-READY MODE

TECHNICAL FIELD

The present description relates in general to computing devices and storage devices, and more particularly to, for example, without limitation, storage devices with a physical input device for secure configuration in a configuration-ready mode.

BACKGROUND

Secure memory storage devices that are free from software typically require that all settings, administrator personal identification numbers, and user personal identification numbers be entered through a physical keypad of each of the secure memory storage devices individually. When there are only one or two secure memory storage devices, the process of entering such settings and identification information is typically not challenging. However, as the number of secure memory storage devices for deployment increases, configuration of the secure memory storage devices becomes exponentially time consuming and burdensome to an operator that is programming each individual device through the physical keypad.

The description provided in the background section should not be assumed to be prior art merely because it is mentioned in or associated with the background section. The background section may include information that describes one or more aspects of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 5 is a block diagram illustrating an example of a computer system with which a host can be implemented.

Figure 1:
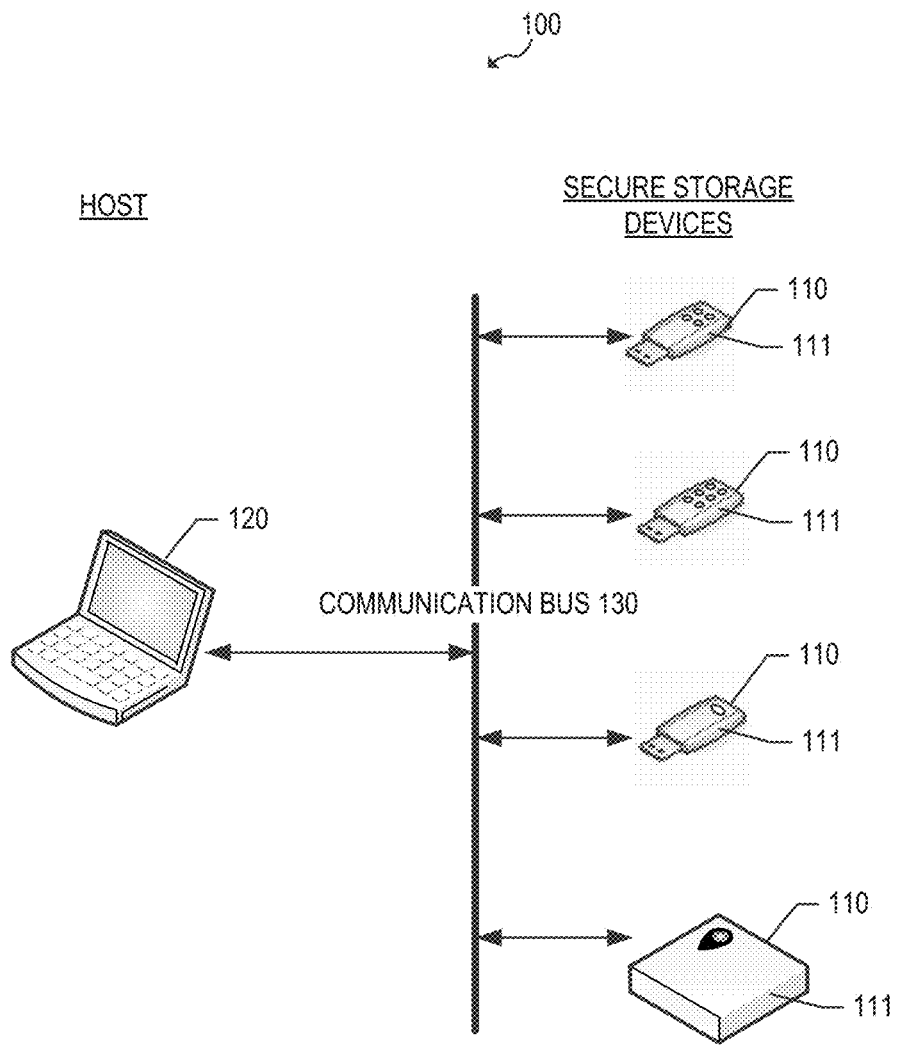
FIG. 1 illustrates an example of architecture for configuring secure storage devices.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In one or more implementations, a secure storage device with heightened security does not require a software application (e.g., on a host) to encrypt the data stored in a memory, a hard drive, or a solid-state drive of a secure storage device. Instead, a secure storage device uses a physical keypad that is used to unlock the secure storage device. Once a secure storage device is unlocked, the device can present itself to a host as a storage device.

A secure storage device that does not use a software application on a host provides improved security but such secure device requires that all settings, administrator personal identification numbers (PINs), and user PINs be entered through a physical keypad of the individual secure storage device. The process of entering such settings and PINs for one or two secure storage devices can be manageable. However, as the number of secure storage devices for deployment increases, configuration of the secure storage devices becomes exponentially time consuming and burdensome to an operator that is programming each individual device through the physical keypad. In some cases, the secure storage devices may be deployed with a default setting, allowing the end users to set the PINs for the secure storage devices, where the end users become the administrators of the devices. In some other cases, secure storage devices may be set with PINs before deployment to the end users; however, knowledge of the PINs can become more widely known by more than one operator prior to deployment to the end users.

The disclosed system addresses these challenges arising in the realm of computer technology by providing a solution rooted in hardware, namely, by providing a special host software application that is enabled to launch a secure configuration of the secure storage device when the secure storage device is determined to be in a configuration-ready mode. The configuration-ready mode represents a security feature to allow or disallow the host software's access to the secure storage device. If the secure storage device, which is plugged into the host, is in the configuration-ready mode, the secure storage device can be detected by the host, and the host software can initiate a configuration process for configuring the secure storage device. On the other hand, when the secure storage device is not in the configuration-ready mode, the host software does not initiate a configuration process and does not configure the secure storage device even when the secure storage device is physically plugged into the host. In one or more implementations, regardless of whether a secure storage device is in a locked state or in a unlocked state, when the secure storage device has been already configured (and thus the device is in a non-configuration-ready mode), the host software does not configure the secure storage device while the device remains in the non-configuration-ready mode. In one or more aspects, a secure storage device that has been already configured may be reset to change the mode of the secure storage device from a non-configuration-ready mode to the configuration-ready mode. In such a situation, while the secure storage device is in the configuration-ready mode, the host software can configure such secure storage device. The host software may communicate with multiple secure storage devices on a data terminal for concurrent configuration of the devices when each device is in the configuration-ready mode.

Various aspects of the subject technology relate to systems, methods, and machine-readable media for secure configuration of secure storage devices in a configuration-ready mode. In one or more implementations, a secure storage device includes a secure memory and a security controller. The security controller can arbitrate access by a host for configuring the secure storage device depending on a mode of operation of the secure storage device. The security controller determines whether the secure storage device is in a configuration-ready mode. The configuration-ready mode indicates that the secure storage device is allowed to communicate with a host to configure the secure storage device. The security controller receives configuration data from the host for configuring the secure storage device when the secure storage device is in the configuration-ready mode. In one or more implementations, the secure storage device is prevented from receiving the configuration data from the host when the secure storage device is not in the configuration-ready mode.

One or more implementations of the subject system provide several advantages, including providing enhanced security of the secure storage device during configuration, allowing configuration data from the host to be deployed to an array of secure storage devices concurrently, preventing the secure storage device from any type of configuration by an external computing system when the secure storage device is not in the configuration-ready mode, and limiting any exchange of data (e.g., data that should be protected) between the secure storage device and the host to occur only after a secure communication channel is established between the host and the secure storage device.

Furthermore, multiple hardware secure storage devices can be deployed easily without compromising the security of the devices by not adding software control to encryption engines in the devices. One or more implementations of the subject technology provide a secure method to store the configuration data that has been set on the devices when deployed. In addition, a user-friendly graphical user interface can be utilized to set the configuration settings and parameters within the secure storage devices.

One or more implementations of the subject solution further provide improvements to the functioning of the computer itself because it increases the security performance of the data storage devices and minimizes security risks to data stored on the devices during the configuration process performed by a host external to the secure storage devices. Specifically, in one or more implementations, the secure storage device requires to be in the configuration-ready mode of operation prior to any communication (e.g., communication that should be protected) between the host and the secure storage device can take place, thereby reducing the likelihood of an unauthorized computing system obtaining unauthorized access to secure data potentially stored on the secure storage device by compromising control of the secure storage device through reconfiguration. In one or more implementations, reconfiguration of the secure storage device using the host software is not possible when the secure storage device is not in the configuration-ready mode. In one or more implementations, each secure storage device in an array of secure storage devices may receive the same or different configuration data from the host but uses an encryption key(s) (e.g., configuration encryption key(s)) unique to each secure storage device and unique for the configuration session, thereby increasing the security performance with respect to the secure storage devices.

The term "configuration-ready mode" may be, for example, indicating that a secure storage device is allowed to communicate with a host to configure the secure storage device (e.g., configure the secure storage device with configuration data such as security information and other configuration setting(s)). The term "configuration-ready mode" may be referred to as "config-ready mode," "config-ready state," or "configuration-ready state."

In one or more implementations, when a secure storage device is unlocked, an access to the device is permitted. In one or more implementations, when a secure storage device is locked, an access to the device is prevented. In one or more examples, when a locked secure storage devices (e.g., a locked device in a non-configuration-ready mode) is plugged into a host, the locked device is not visible to the host, and the locked device is not detectable by the host (e.g., not detectable by the operating system at the host) as no information about the locked device (e.g., no product identifier, vendor identifier, or other enumeration information about the device) is provided to the host.

FIG. 1 illustrates an example of architecture for configuration of secure storage devices suitable for practicing one or more implementations of the disclosure. The architecture 100 includes a host 120 and secure storage devices 110 connected over a communication bus 130.

The host 120 is operable to configure the secure storage devices 110 with configuration data. In one or more implementations, configuration data may include security information (e.g., one or more PINs). In one or more implementations, configuration data may also include other configuration setting(s). For purposes of deploying configuration data concurrently to an array of secure storage devices, multiple secure storage devices 110 can be connected to the host 120 over a common data terminal (e.g., the communication bus 130).

The host 120 can be, for example, a desktop computer, a personal computer (PC), a server, a mobile computer, a tablet computer (e.g., an e-book reader), a mobile device (e.g., a smartphone or personal digital assistant (PDA)), or any other type of devices or systems having appropriate processor, memory, and communications capabilities for configuring the secure storage device(s) 110. The host 120 may include one or more computing devices.

The secure storage device 110 can be a storage device having appropriate processor, memory, and communications capabilities for storing secure data, serving as a secure data back-up, and/or transferring secure data. The secure data may be accessible by various computing devices including the host 120 over the communication bus 130. A device 110 may be sometimes referred to as a drive or a memory apparatus.

The communication bus 130 can include or can be a part of, for example, any one or more of a universal serial bus (USB), IEEE 1394, Ethernet, serial ATA, and/or any other type of communication bus, communication interface or communication port. A communication bus may be referred to as a communication channel, a communication medium, or vice versa. Further, the communication bus 130 can include, but is not limited to, any one or more of the following network topologies, including a bus network, a star network, a ring network, a mesh network, a star-bus network, tree or hierarchical network, or any other suitable type of network.

Figure 2:
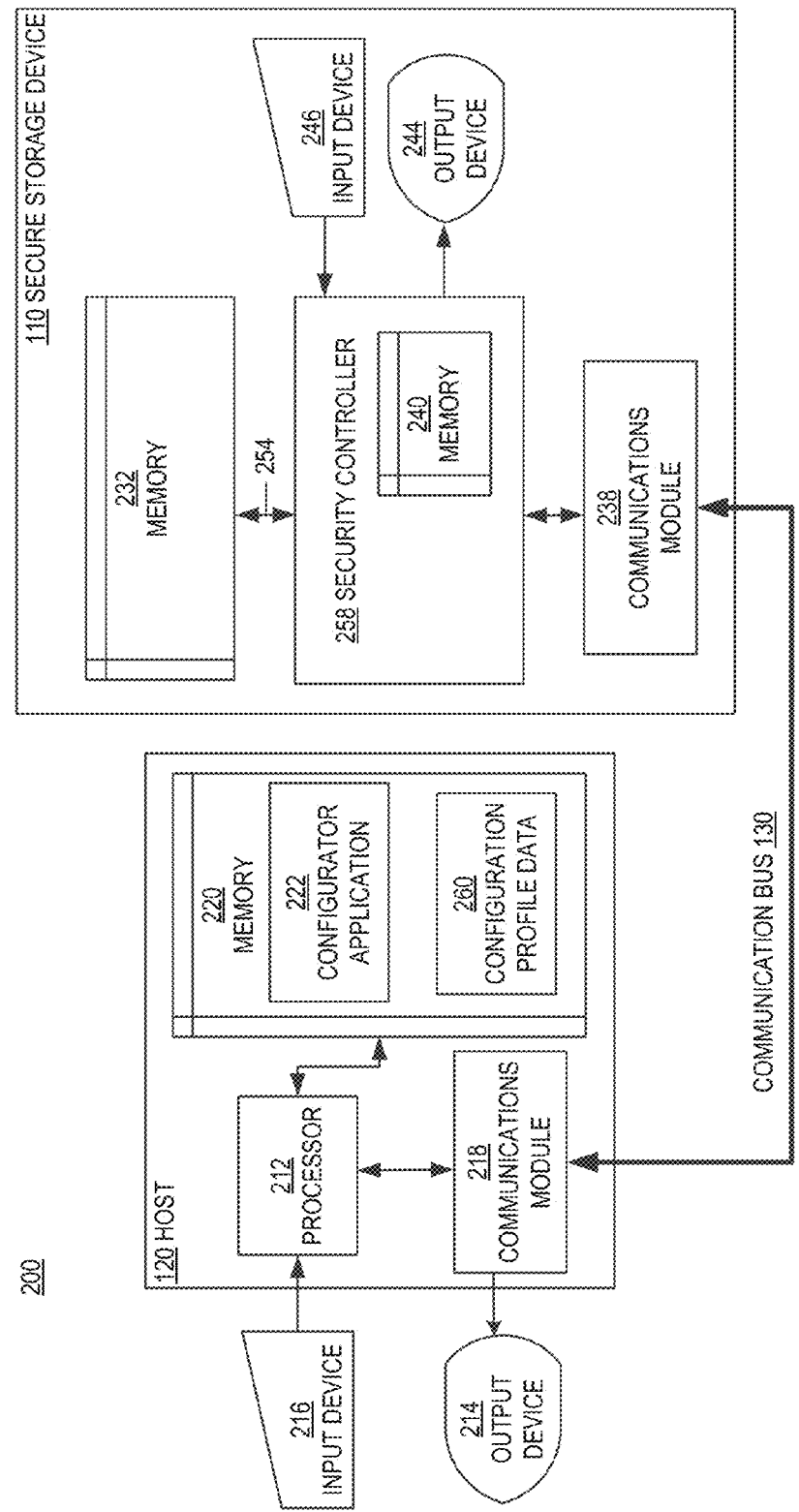
FIG. 2 is a block diagram illustrating an example of a secure storage device and a host.

FIG. 2 is a block diagram illustrating an example of a secure storage device 110 and the host 120. The host 120 and the secure storage device 110 are connected over the communication bus 130 via respective communications modules 218 and 238.

The communications modules 218 and 238 are configured to interface with the communication bus 130 to send and receive information, such as data, requests, responses, and commands between the host 120 and the secure storage device 110. The communications modules 218 and 238 can be, or can be a part of, for example, serial bus connectors or interfaces. The communications modules 218 and 238 may be referred to as, or may include, network interfaces or communication interfaces. In one or more examples, the communications module 218 and the communication bus 130 may be a part of a USB. In one example, the communications module 238 may be a part of a USB connector, and the communications module 218 and the communication bus 130 may be a part of a USB port(s), and the USB connector may be connected to the USB port. In one example, each of the communications modules 218 and 238 and the communication bus 130 is a wired communications module or bus. In another example, each of the communications modules 218 and 238 and the communication bus 130 may be a wireless communications module or bus. In one or more implementations, the communications modules 218 and 238 and the communication bus 130 may include, or be part of, a wireless interface(s), a wireless port(s), a wireless medium/media, and/or a wireless channel(s) to allow wireless communications between a host and a secure storage device(s)).

The host 120 includes a processor 212 and a memory 220. The memory 220 of the host 120 includes a configurator application 222 and configuration profile data 260. Configuration profile data may be sometimes referred to as a configuration profile, configuration data, or vice versa. The memory 220 may be a read-and-write memory, a read-only memory, a volatile memory, a non-volatile memory, or a combination of some or all of the foregoing. From the memory 220, the processor 212 may retrieve instructions to execute and data to process in order to execute the processes of the subject disclosure. The processor 212 can be a single processor, multiple processors, or a multi-core processor in different implementations.

The secure storage device 110 includes a memory 232 and a security controller 258. The secure storage device 110 may further include a communications module 238, an input device 246, and an output device 244. The input device may be referred to as a physical input device, a physical key input device, or a key input device. The output device may be referred to as a physical output device.

In one or more implementations, the secure storage device 110 includes a casing (e.g., 111 as illustrated in FIG. 1). The casing may be, for example, a metal-based casing (e.g., aluminum) or a hardened plastic material. The casing may be made of multiple parts. In one or more implementations, the memory 232 and the security controller 258 are disposed within the casing.

The memory 232 is configured to store secure data (e.g., encrypted data). The memory 232 may be, or may include, a read-and-write memory, a read-only memory, a volatile memory, a non-volatile memory, registers, or a combination of some or all of the foregoing. In some aspects, the memory 232 is a non-volatile memory unit that stores data even when the secure storage device 110 is powered off. The memory 232 may include one or more memories. The memory 232 may include a flash memory, a hard drive, a solid-state drive, or some combination thereof. In one or more implementations, the memory 232 is a mass storage device.

The memory 232 may be communicably coupled to the security controller 258 via a bidirectional communication link 254. In one or more implementations, the link 254 is a high-speed serial advanced technology attachment (SATA) for point-to-point connection between the memory 232 and the security controller 258.

The physical input device 246 enables a user to communicate information and select commands to the secure storage device 110. For example, the physical input device 246 may receive a security identification code (e.g., one or more of an administrator PIN, a user PIN, a recovery PIN, a self-destruct PIN and/or a combination thereof) from a user to facilitate unlocking of the secure storage device. The security identification code may also facilitate authentication of the user. The physical input device 246 may receive other control input to control the operation of the secure storage device. For instance, the physical input device 246 may receive a control input from a user to place the secure storage device 110, from a mode that is not configuration-ready, into a configuration-ready mode. In one example, when a user presses one or more buttons on the physical input device 246, the security controller 258 places the secure storage device into the configuration-ready mode. Such one or more buttons are predetermined and preset to cause this operation when pressed.

The physical input device 246 may include any acoustic, speech, visual, touch, tactile and/or sensory input device, such as a keypad, a pointing device, a dial, a sensor device (e.g., a biometric sensor, a finger sensor, biometric iris recognition sensor), or a touchscreen. In one or more implementations, the physical input device 246 is disposed on or at an outer surface of the casing so that a user can access the physical input device. Having a physical input device on the secure storage device itself allows a user to securely access the device or prevent access to the device without using an external system, such as a host computer or host software. The physical input device 246 is configured to receive an input provided by a user. In one or more implementations, the input includes one or more keypad entries, a biometric-based entry, a touch gesture entry, or a combination thereof.

The physical output device 244 may be disposed on or at the outer surface of the casing and configured to display an indication of the operation of the secure storage device 110. Such indication may be controlled by the security controller 258. The output device 244 may enable, for example, the display or output of visual signaling by the security controller 258. The indication may include a signal indicating (i) that a process has initiated to place the secure storage device into a configuration-ready mode and/or (ii) that the secure storage device 110 is in a configuration-ready mode. For example, this indication may be displayed when a user presses one or more buttons on the physical input device 246 designated to set the secure storage device into a configuration-ready mode. In one aspect, an indication may be displayed on the output device 244, when the security controller 258 determines that the secure storage device 110 is in the configuration-ready mode. The output device 244 may also provide indications of other types of operation of the secure storage device, such as an indication that the device is locked or unlocked. The output device 244 may include any visual, auditory, tactile, and/or sensory output device to allow a user to detect an indication of the operation of the secure storage device 110. One or more implementations may include a device(s) that functions as both an input and output device, such as a touchscreen.

The communications module 238 of the secure storage device 110 is configured to connect the secure storage device 110 to the communication bus 130 external to the casing. The communications module 238 may include, or may be a part of, a single Standard-A USB plug to serve as a physical interface to the communication bus 130 in some examples, or the communications module 238 may include, or may be a part of, a micro USB plug in other examples. In yet another example, the communications module 238 may include, or may be a part of, a Type-C connector. These are examples, and the communications module 238 is not limited to these examples. The communications module 238 may be, for example, disposed partially within the casing and partially outside the secure storage device 110. In one or more examples, the communications module 238 is coupled to and protrude from the casing.

In one or more implementations, the secure storage device 110 includes a battery(ies) (not shown) that may power the secure storage device 110 or a portion(s) thereof. In one example, the battery(ies) may power the security controller 258 (or a portion(s) thereof), the physical input device 246, and/or the physical output device 244. In another implementation, the secure storage device 110 does not include a battery.

Still referring to FIG. 2, in one or more implementations, a security controller 258 is coupled to the memory 232, the physical input device 246, the physical output device 244, and the communications module 238.

In one example, a security controller 258 is a single controller. In another example, a security controller 258 includes multiple controllers (e.g., two controllers or more than two controllers). A controller may be sometimes referred to as a microcontroller, a multi-core controller, a controller module, a processor, a processor module, a microprocessor, a microprocessor module, or a portion(s) thereof or vice versa. A controller(s) within a security controller 258 may be sometimes referred to as a microcontroller(s). A microcontroller may include one or more microcontrollers. When a security controller 258 has multiple microcontrollers, each microcontroller may perform different functions, and a microcontroller may be implemented with a different level of security protection (e.g., a high, medium, or low security level). Such security level may be implemented in hardware, firmware, or a combination thereof.

A security controller 258 may be a single integrated circuit (IC) chip (or a single die) or may include multiple IC chips. Multiple controllers within the security controller 258 may be on a single chip. Multiple controllers within the security controller 258 may be on separate chips.

In one or more implementations, a security controller 258 is not a general purpose processing device. In one or more implementations, a security controller 258 includes one or more application-specific digital signal processors or one or more application-specific integrated circuits. In one or more implementations, a security controller 258 may include discrete hardware components or other suitable components that can perform the functions described herein. In one or more examples, a security controller 258 (or one or more microcontrollers therein) is implemented in hardware and embedded firmware (without high-level software applications).

Microcontrollers within the security controller 258 may be coupled, directly or indirectly, to each other, using communication links. A communication link may be a serial peripheral interface (SPI) bus for synchronous communication between the microcontrollers. A communication link may be a bidirectional communication link. A communication link may be an inter-integrated circuit ($I^2C$) bus, where one microcontroller is implemented as a master node and another microcontroller is implemented as a slave node, in some examples. These are examples, and a communication link is not limited to these examples.

In one or more implementations, a security controller 258 includes a local memory 240. The local memory 240 may be a read-and-write memory, a read-only memory, EEPROM, registers, a volatile memory, a non-volatile memory, or a combination of some or all of the foregoing. A local memory 240 may be a single memory or multiple memories. A memory may include one or more memories. When a security controller 258 includes multiple microcontrollers and multiple memories, each microcontroller may have its associated local memory(ies). Such local memory(ies) may reside within its corresponding microcontroller. Such local memory(ies) may reside outside its corresponding microcontroller. A memory may be implemented with a different level of security protection. The security level may be implemented in hardware, firmware, or a combination thereof.

The local memory 240 or a memory(ies) therein may be configured to store instructions and/or data, including parameters, flags, and/or information. The local memory 240 or a memory(ies) therein may store instructions/data that the security controller 258, a microcontroller(s) therein, and/or another component(s) may need at runtime. From the local memory 240 (or a memory(ies) therein), the security controller 258, a microcontroller(s) within the security controller 258, and/or another component(s) may retrieve instructions to execute and data to process in order to execute the processes of the subject disclosure.

In one or more implementations, all instructions/data (e.g., configuration data, other data, indications, keys, instructions, parameters, flags and information) stored in the secure storage device 110 (e.g., 240) is encrypted or securely stored. In one or more other implementations, some instructions/data (e.g., a portion or some of configuration data, other data, indications, keys, instructions, parameters, flags and/or information) stored in the secure storage device 110 (e.g., 240) is encrypted or securely stored. In one or more yet other implementations, some instructions/data (e.g., configuration data, other data, indications, keys, instructions, parameters, flags and/or information) stored in the secure storage device 110 (e.g., 240) is not encrypted. In one or more implementations, the user data stored in the memory 232 is encrypted or securely stored.

The security controller 258 may provide instructions to prevent or allow data transfer between the secure storage device 110 and an external system (e.g., the host 120). The security controller 258 may prevent the host 120 from accessing and configuring the secure storage device 110 when the secure storage device 110 is not in a configuration-ready mode.

In one or more implementations, configuration data of a secure storage device is settable or changeable by a user. For example, a user (or an administrator or an operator) may change configuration data such as security information (e.g., one or more PINs) or other configuration settings (e.g., auto-lock, lock-override, or other settings) associated with a configuration of the secure storage device. This change can be made by the secure storage device, for example, using a physical input device (e.g., 246) of the secure storage device. In one or more aspects, this change by the secure storage device may be made when the secure storage device is in a configuration-ready mode or when the secure storage device is in a non-configuration ready mode. Furthermore, configuration data may be changed by a configurator application 222 when a secure storage device is in a configuration-ready mode. Security information may be sometimes referred to as a security identification code, a security personal identification code, a personal identification code, a security parameter(s), or vice versa.

Illustration of Examples of Configuration-Ready Mode

In one or more implementations, a secure storage device 110 can be in a configuration-ready mode, for example, by being in (i) an "out-of-box" mode or (ii) a "user-set" configuration-ready mode. These implementations provide security as well as secure flexibility.

In one or more other implementations, a configuration-ready mode is established only by being in an out-of-box mode, and such implementations do not allow a user-set configuration-ready mode. In one or more aspects, these implementations provide heightened security as a secure storage device can be configured by an external system (e.g., a host) only once, but these implementations do not provide the flexibility to reset a storage device back into a configuration-ready mode by a user.

The descriptions below illustrate examples of an out-of-box mode.

In one or more implementations of an out-of-box mode, when a secure storage device 110 is in a factory sealed box or is out of the sealed box without any input entered into the secure storage device by a user (e.g., a secure storage device is in a box shipped to a user or ready to be shipped; or a box containing a secure storage device is opened, and the device is out of the box but no input has been entered into the secure storage device by a user), the secure storage device may be considered to be in an out-of-box mode. An "out-of-box mode" may be referred to as an "out-of-box state" or a "brand new" state.

In some aspects of this out-of-box mode, no security information (e.g., PINs) or other configuration settings (e.g., auto-lock, lock-override, etc.) have been applied and stored on the secure storage device 110. In one or more implementations, the secure storage device thus does not contain any configuration data, such as security information or other configuration settings. The secure storage device is in a "pristine" state.

In one or more implementations, a secure storage device in an out-of-box mode may be viewed as having "null" configuration data. Null configuration data may include "null" security information (e.g., one or more "null" PINs). In one or more implementations, null configuration data may further include default configuration setting(s) (e.g., default setting for auto-lock, default setting for lock-override, etc.).

In one or more examples, when a secure storage device 110 has "null" configuration data, all configuration data is null. For example, all security information (e.g., all PIN(s)) is null. Further, for example, all other configuration settings (e.g., settings for auto-lock, brute force attempt, self-destruct, lock-override, key press led indicator, drive format, etc.) are set to their predetermined values (e.g., default values).

In one or more implementations, null configuration data is not entered by a user. For example, null PIN(s) are not entered by a user. Further, for example, default configuration settings are not entered by a user.

Valid configuration data that is stored in a secure storage device 110 is usable to operate the secure storage device, for example, during a normal operation (e.g., in a non-configuration-ready mode). For instance, a valid PIN (e.g., a valid administrator PIN, a valid user PIN) can be entered to unlock a device after the device is locked. When a user enters a PIN, if the entered PIN matches the PIN stored in the secure storage device 110, then the PIN is valid, which allows the device to unlock.

On the other hand, "null" configuration data (e.g., null PIN(s)) in the secure storage device 110 is not usable to operate the secure storage device, for example, during a normal operation (e.g., in a non-configuration-ready mode). A null configuration data is not usable for its intended purpose or function. For instance, a "null" PIN (e.g., a null administrator PIN, a null user PIN, or a null self-destruct PIN) is not usable to unlock a device after the device is locked. A "null" recovery PIN is not usable to create a new valid PIN. When a secure storage device 110 contains a valid recovery PIN, this can place the device into a state of "user-forced enrollment" so that when a user enters the recovery PIN, the device 110 allows the user to enter a new PIN (e.g., a new administrator PIN or a new user PIN) that can be used to unlock the device after being locked. However, a "null" recovery PIN in the secure storage device 110 does not place the device into a state of "user-forced enrollment" and thus does not allow a user to enter a new PIN to unlock the device after being locked.

In one or more implementations, while default configuration settings (e.g., default settings for auto-lock, lock-override, etc.) may be usable to operate the secure storage device during a normal operation (e.g., reading and writing to/from the memory 232), null PINs are not usable for the normal operation.

In one or more aspects, a null PIN is not a valid PIN. A null PIN may be a PIN in which at least a part or all parts of the PIN (e.g., an administrator PIN, a user PIN, a recovery PIN, or a self-destruct PIN) is not enterable via the physical input device. For example, if the physical input device 246 is a keypad having only alphanumeric keys, a null PIN may contain one or more characters, symbols or other items that are not alphanumeric; hence, such null PIN cannot be entered via the keypad. In one or more implementations, a null PIN is not all zeros. In one or more implementations, all PINs are null PINs, and none of the null PINs is all zeros.

In one or more implementations, a null PIN (e.g., a null administrator PIN, a null user PIN, or a null self-destruct PIN) is not usable to unlock the secure storage device 110 after the device is locked. In one or more implementations, a null PIN (e.g., a null recovery PIN) is not usable to create a PIN to unlock the secure storage device 110 after the device is locked. In one or more implementations, a null PIN (e.g., a null administrator PIN, a null user PIN, a null self-destruct PIN, or a null recovery PIN) is not usable to facilitate unlocking the secure storage device after the device is locked.

In one or more aspects of an out-of-box mode, a secure storage device 110 contains a brand new encryption key(s) (e.g., a new (or fresh) data transfer encryption key for encrypting/decrypting data to/from a memory 232). In one or more implementations, the new encryption key(s) may also include a new (or fresh) handshake key(s) to be used during a handshake process. In one example, the handshake key(s) includes a handshake key(s) for a secure storage device 110 (e.g., the security controller 258 (or a microcontroller therein)). In another example, the handshake key(s) includes a handshake key(s) for a host (e.g., the configurator application 222). In one or more implementations, the security controller 258 (or a microcontroller therein) generates the new encryption key(s). In one or more aspects, the secure storage device 110 (e.g., the memory 232) is considered securely "erased" (e.g., crypto-erased), and any encrypted data, if any, previously stored on the secure storage device 110 (e.g., 232) is unrecoverable because any previously stored data (e.g., encrypted data that was stored in the secure storage device before the new encryption key is generated) cannot be decrypted using the new data transfer encryption key. The new data transfer encryption key may be, however, used to encrypt new data to be stored into the secure storage device 110 (e.g., the memory 232) from the time the new data transfer encryption key is created.

In one or more aspects, having "new" encryption key(s) in this context can be understood as "erasing" or "removing" any encryption key(s) that might have been previously stored in a secure storage device 110 (e.g., stored prior to creating the new encryption key(s)) and replacing them with fresh or new encryption key(s). In one or more implementations, a new encryption key is different from a previous encryption key, if any. In one or more examples, an aspect of this can be understood as there is no data transfer encryption key in the secure storage device to decrypt the data previously stored in the secure storage device, or can be understood as there is a new data transfer encryption key in the secure storage device that is not usable to recover encrypted data previously stored in the secure storage device (e.g., the memory 232).

In one or more aspects, a new data transfer encryption key is not usable to decrypt data, if any, previously stored in the memory 232; hence, encrypted data that was previously stored cannot be read from the memory 232 using the new data transfer encryption key, and any encrypted data previously stored on the secure storage device 110 (e.g., 232) is unrecoverable.

For an out-of-box mode, an indication (e.g., a flag) is set within a secure storage device 110 indicating that the secure storage device 110 is in a configuration-ready mode. For example, the security controller 258 (or a microcontroller therein) may set this indication.

The descriptions below illustrate examples of a user-set configuration-ready mode.

A secure storage device 110 that is not in a configuration-ready mode can be set to a "user-set" configuration-ready mode by a user (e.g., an administrator, an operator, any other person, or an entity who is associated with or has a right to control the secure storage device).

For example, after a secure storage device 110 has been set with a PIN(s), and has stored encrypted user data in a memory (e.g., 232), if a user desires to place the secure storage device back into a configuration-ready mode, then the user can provide an input via the physical input device 246 (e.g., pressing a predetermined key or key combination) that is associated with placing the device into a configuration-ready mode. In response to the user input, the secure storage device 110, using, e.g., the security controller 258 (or a microcontroller therein), may (i) "nullify" configuration data, (ii) create new encryption key(s), and (iii) reset a predesignated indication to a configuration-ready mode (e.g., a flag in a register).

To reset a secure storage device into a user-set configuration-ready mode, the security controller 258 (or a microcontroller therein) may "nullify" configuration data. In one or more implementations, nullifying configuration data may include nullifying security information (e.g., one or more PINs, such as administrator, user, recovery, and self-destruct PINs). In one or more implementations, nullifying configuration data may further include resetting other configuration setting(s) (e.g., settings for auto-lock, lock-override, self-destruct, etc.) previously stored in the secure storage device 110 into their default settings. In one or more aspects, this nullifying process may erase (or remove) and replace configuration data previously stored with "null" configuration data, such as "null" security information (e.g., "null" PIN(s)). This nullifying process may erase and replace any previously stored configuration setting(s) with default configuration setting(s). "Null" configuration data and "null" PINs in a user-set configuration-ready mode have the same or substantially similar functions and characteristics as the "null" configuration data and the "null" PINs described with respect to an out-of-box mode.

In one or more implementations of resetting a secure storage device into a user-set configuration-ready mode, the security controller 258 (or a microcontroller therein) creates new encryption key(s) (e.g., a new (or fresh) data transfer encryption key for encrypting/decrypting data to/from a memory 232). In one or more implementations, the new encryption key(s) may also include new (or fresh) handshake key(s) to be used during a handshake process. In one example, the handshake key(s) includes a handshake key(s) for a secure storage device 110. In another example, the handshake key(s) includes a handshake key(s) for a host (e.g., the configurator application 222). In one or more implementations, creating new encryption key(s) may be understood as, for example, erasing (or removing or crypto-erasing) any encryption key(s) previously stored in the secure storage device 110 and replacing any such key(s) with new encryption key(s). "New" encryption key(s) in a user-set configuration-ready mode have the same or substantially similar functions and characteristics as the "new" encryption key(s) described with respect to an out-of-box mode.

When a secure storage device 110 is reset to a user-set configuration-ready mode, an indication (e.g., a flag) is set within a secure storage device 110 indicating that the secure storage device 110 is in a configuration-ready mode. For example, the security controller 258 (or a microcontroller therein) may set this indication.

In one or more implementations, when a secure storage device 110 is in a configuration-ready mode (e.g., an out-of-box mode or a user-set configuration-ready mode), all configuration data is null. In one or more implementations of a configuration-ready mode, the secure storage device 110 does not contain any security information (or any security identification code, such as any PIN) that is enterable (e.g., via the physical input device 246) to facilitate unlocking the secure storage device after the device is locked. Described in another way, in one or more implementations of a configuration-ready mode, the secure storage device 110 does not contain any security information (or any security identification code, such as any PIN) that is enterable (e.g., via the physical input device 246) to unlock the secure storage device after the device is locked. Explained in another way, in one or more implementations of a configuration-ready mode, none of the security information (e.g., none of the PIN(s)) contained in the secure storage device is usable or enterable (e.g., via the physical input device 246) to unlock the secure storage device after the device is locked.

In one or more implementations, to place a secure storage device into a configuration-ready mode (e.g., an out-of-box mode or a user-set configuration-ready mode), the following steps may be performed concurrently or sequentially: nullifying the configuration data, creating new encryption key(s), and resetting the configuration-ready mode indication. For example, nullifying configuration data and creating new encryption key(s) may be performed concurrently or sequentially and then after the successful completion of the foregoing steps (i.e., nullifying and creating steps) is verified, the configuration-ready mode indication may be reset.

In one aspect of one or more implementations, the security controller 258 (or a microcontroller therein) determines whether the secure storage device 110 is in a configuration-ready mode by reading an indication (e.g., a flag in the device 110) of a mode of operation and determining whether the indication is set to indicate that the secure storage device 110 is in the configuration-ready mode. When a configuration-ready mode flag in the device 110 is set (e.g., a predetermined value indicating a configuration-ready mode), the secure storage device 110 is determined to be in a configuration-ready mode. In one aspect of one or more implementations, the device 110 makes the determination without using any information (e.g., any instructions or data) from outside the device 110. In one aspect of one or more implementations, the determination is independent of any information from a host (e.g., independent of any input, inquiry, instructions or data from the configurator application 222). In one aspect of one or more implementations, the determination is independent of the device type. In one aspect of one or more implementations, the determination is made using a self-determination process performed entirely by the device 110.

In another aspect of one or more implementations, the security controller 258 (or a microcontroller therein) may determine whether the secure storage device 110 is in a configuration-ready mode by examining whether security information (e.g., a PIN(s)) contained in the secure storage device 110 is null. In this respect, the security controller 258 may perform a read operation of a memory within the device 110 where such security information is stored and determine the status of such security information. The security controller 258 determines that the secure storage device 110 is in the configuration-ready mode when the secure storage device 110 is determined to include null security information (e.g., all PINs are null). The security controller 258 (or a microcontroller therein) may determine that the secure storage device 110 is not in the configuration-ready mode when the secure storage device 110 is determined to include valid security information (e.g., at least one PIN is not null). Hence, when the secure storage device 110 contains valid security information, the secure storage device 110 is not in a configuration-ready mode.

In one or more examples, when a secure storage device 110 is in a configuration-ready mode, the output device 244 may indicate this configuration-ready mode by emitting one or more lights such as green and blue light-emitting diodes (LEDs).

Once the security controller 258 of a secure storage device 110 determines that the device 110 is in a configuration-ready mode, and if the device 110 is plugged into a host 120, the security controller 258 (or a microcontroller therein) may provide the indication of the configuration-ready mode (via the communications module 238) to the communication bus 130 for provision to the host so that the host 120 can determine that the device 110 is in a configuration-ready mode based on the indication received from the device 110.

As an illustration, when a secure storage device 110 is in a configuration-ready mode, the security controller 258 (or a microcontroller therein) provides instructions to open the secure storage device upon power up with a special flag. The configurator application 222 of the host 120 seeks for the flag (e.g., via an USB call) upon detection of a connected secure storage device, and if the flag is set, the configurator application 222 determines that the secure storage device is in a configuration-ready mode and ready for configuration.

Explaining the above illustration in a different way, when a secure storage device 110 is plugged into a host 120, and whenever the secure storage device is in a configuration-ready mode, the security controller 258 provides instructions to open on a configuration-ready state with the configuration-ready flag set. When the configurator application 222 communicates with the secure storage device 110 via the security controller 258, the configurator application 222 can read the value of the configuration-ready flag and determine that the secure storage device is in a configuration-ready mode.

In one or more implementations, the host 120 (e.g., the configurator application 222) can configure a secure storage device 110 only when the secure storage device 110 is in a configuration-ready mode. In other words, the host 120 cannot configure a secure storage device that is in a non-configuration-ready mode.

Illustration of Examples of Operations of Device and Host

In one or more implementations, the security controller 258 (or a microcontroller(s) therein) of the secure storage device 110 is configured to execute instructions, such as instructions physically coded into the security controller 258 (or the microcontroller(s)), instructions received from firmware in the local memory 240 (or the memory(ies) associated with the respective microcontroller(s)), or a combination of both. For example, the security controller 258 (or a microcontroller therein) executes instructions to cause detecting that the secure storage device 110 is powered on, when the secure storage device 110 is applied with power, e.g., from the host 120 via the communication bus 130 when the secure storage device 110 is plugged into a port associated with the communication bus 130. In one or more examples, the communications module 238 of the secure storage device 110 includes, or is a part of, a powered USB interface.

In one implementation, the security controller 258 (or a microcontroller therein) determines whether the secure storage device 110 is in a configuration-ready mode after detecting the device 110 (or the security controller 258, or a portion(s) thereof) is powered on or after the device 110 (or the security controller 258, or a portion(s) thereof) is powered on. In another implementation, the security controller 258 (or a microcontroller therein) may determine whether the secure storage device 110 is in a configuration-ready mode before detecting the device 110 (or the security controller 258, or a portion(s) thereof) is powered on or before the device 110 (or the security controller 258, or a portion(s) thereof) is powered on. In one or more examples, the device 110 (e.g., the entire device 110, the security controller 258, or a portion(s) of the device 110) may be powered on by the host via the communications module 238.

The security controller 258 (or a microcontroller therein) is configured to cause sending an instruction or data to the host 120 via the communication module 238 when the secure storage device 110 is determined to be in the configuration-ready mode. For example, a microcontroller within the security controller 258 may send the instruction or data to a second microcontroller via a communication link, and the second microcontroller may send the instruction or data to the host 120 via the communication module 238. In some examples, the data may include identifier information associated with the secure storage device 110 and/or other enumeration information. The communication bus 130 may be associated with a USB communication protocol such that the identifier information and/or other enumeration information are placed on the communication bus 130 in accordance with the USB communication protocol. In one or more implementations, the identifier information includes a product identifier (e.g., USB product ID) and a vendor identifier (e.g., USB vendor ID).

In one or more implementations, the identifier information (e.g., the product identifier and vendor identifier) is a part of enumeration information. Enumeration may be a process of detecting and identifying a device attached to a host, such as a secure storage device. In one or more implementations, enumeration information may include a device descriptor, a configuration description, and an interface descriptor. In one example, enumeration information includes USB enumeration information, which may include, for example, a USB product ID, USB vendor ID, USB device type, USB device class, USB device speed, USB device descriptor, etc. In one or more implementations, enumeration information is not settable or changeable by a user. In one or more implementations, enumeration information is permanent information describing a device.

In one or more implementations, the processor 212 on the host, using for example an operating system of the host, may scan the communication bus 130 and identify the secure storage device 110 as one of the devices connected to the host 120 based on the identifier information and/or other enumeration information provided by the secure storage device or scanned by the host (e.g., by the operating system of the host). The processor 212, e.g., the configurator application 222 running thereon, may then send a query, to the secure storage device 110 (or to each of the secure storage devices 110) connected to the host 120, requesting information as to whether the secure storage device is in a configuration-ready mode. In response to the query, the security controller 258 of the secure storage device 110 may provide the indication of the configuration-ready mode (e.g., the value of the configuration-ready mode flag) to the host 120 via the communications module 238 and the communication bus 130. For example, a microcontroller within the security controller 258 may provide the indication to a second microcontroller, which provides the indication to the host via the communications module 238 and the communication bus 130.

In another implementation, the security controller 258 (or a microcontroller therein) may provide the indication, for transmission to the host, without the host 120 (e.g., the configurator application 222) requesting such information. In one example, the indication may be provided upon completion of an enumeration process.

In one or more implementations, the enumeration process (e.g., providing/obtaining the identifier information and other enumeration information) is performed by the secure storage device 110 and the host (e.g., the operating system of the host) without encryption. In one or more implementations, the indication of the configuration-ready mode is provided from the secure storage device 110 (e.g., a microcontroller therein) to the host 120 (e.g., the processor 212 running the configurator application 222) without encryption. In another implementation, the indication may be provided using a secure method.

The processor 212 (e.g., the configurator application 222) and the security controller 258 (or a microcontroller therein) are configured to cause facilitating a handshake process when the secure storage device 110 is determined to be in the configuration-ready mode. In one or more implementations, the host 120 (e.g., the configurator application 222 using the processor 212) and the device 110 (e.g., the security controller 258 or a microcontroller therein) perform a handshake and establish a new secure encryption key(s), which may be referred to as a configuration encryption key(s).

In one or more implementations, the configuration encryption key(s) may be generated based on the handshake process (e.g., based on the data provided during the handshake process). In one or more implementations, the host 120 and the secure storage device 110 create a configuration encryption key(s) based on one or more handshake key(s). In one example, the processor 212 (e.g., the configurator application 222) generates a configuration encryption key for the host based on one or more handshake key(s). In one example, the security controller 258 (or a microcontroller therein) generates a configuration encryption key for the device 110 based on one or more handshake key(s).

The configuration encryption key(s) may be used to encrypt the configuration data (e.g., by the configurator application 222 using the processor 212) and to decrypt the configuration data (e.g., by the security controller 258 or a microcontroller therein).

In another implementation, a configuration encryption key may be established without using a handshake process. In one example, a configuration encryption key may be a predetermined key, and is not generated at runtime of the configurator application. In one example, no handshake keys are used or generated during a configuration process. In another implementation, the host and secure storage device may utilize other methods of a handshake process. In another implementation, the host and the secure storage device may utilize other methods to create a configuration encryption key(s).

The security controller 258 (or a microcontroller therein) executes instructions to cause receiving configuration data from the host 120 via the communication bus 130 for configuring the secure storage device 110 when the secure storage device 110 is determined to be in the configuration-ready mode. In some examples, the secure storage device 110 is prevented from receiving the configuration data from the host 120 when the secure storage device 110 is determined not to be in the configuration-ready mode. In one or more implementations, the host 120, e.g., the configurator application 222, retrieves the configuration profile data 260 and encodes the configuration data using a configuration encryption key (e.g., the host's configuration encryption key). In this respect, encrypted configuration data is passed to the secure storage device 110 from the host 120 over a secure communication channel via the communication bus 130. In the illustration, the security controller 258 (or a microcontroller therein) receives the configuration data, and the security controller 258 (or the microcontroller therein) decrypts the encrypted configuration data received from the host 120 using a configuration encryption key (e.g., the device's configuration encryption key).

In one or more implementations, the security controller 258 (or a microcontroller therein) is configured to cause initiating, based on the determination that the secure storage device 110 is in the configuration-ready mode, configuration of the secure storage device 110 using the received configuration data. Once decrypted by the security controller 258 (or a microcontroller therein), the security controller 258 (or a microcontroller therein) may begin to load security information (e.g., one or more PINs) and other configuration setting(s) (e.g., auto-lock, self-destruct, lock-override settings) for storage into the secure storage device 110. The configuration data, once loaded into the secure storage device 110, enables the secure storage device 110 to store and/or transfer secure data (e.g., into/from the memory 232) for a user(s) of the secure storage device 110 based on the loaded configuration profile. In one or more implementations, the configuration data contains at least one PIN that is usable or enterable (via the physical input device 246) to facilitate unlocking (or to unlock) the secure storage device 110 after being locked. The security controller 258 (or a microcontroller therein) then determines whether the configuration of the secure storage device 110 is complete.

In one or more implementations, the security controller 258 (or a microcontroller therein) stores an indication that the secure storage device 110 is not in the configuration-ready mode when the configuration of the secure storage device 110 is determined to be complete. For example, the security controller 258 (or a microcontroller therein) may modify the value of the configuration-ready flag in the secure storage device 110 from a value (e.g., 1) that represents a configuration-ready state to another value (e.g., 0) that represents a non-configuration-ready state.

The security controller 258 (or a microcontroller therein) then may cause termination of the configuration session with the host (e.g., terminating the communication with the host 120 or terminating a connection to the host 120) via the communication bus 130 when the configuration of the secure storage device 110 is determined to be complete. The change in the flag setting to reflect the non-configuration-ready mode causes the secure storage device 110 to be inaccessible by the configurator application in the host 120 for a new configuration connection subsequent to the terminated connection. For example, a new configuration session subsequent to the current configuration session is not permitted when the secure storage device 110 is in a non-configuration-ready mode. In one or more aspects, the security controller 258 (or a microcontroller therein) may generate and provide a new instruction to lock access for configuration when the configuration is complete and/or the flag setting has been set to indicate the non-configuration-ready mode. As such, the secure storage device 110 is prevented from being configured by the host. In one or more implementations, the device 110 needs to be reset to a configuration-ready mode (e.g., by nullifying or erasing any previous configuration data and by creating a new data transfer encryption key, which can be viewed as erasing any encrypted data previously stored in the memory 232) by a user before the device 110 can be configured again by the configurator application 222.

In another implementation, once a secure storage device 110 is configured by a host (e.g., by the configurator application), the device is prevented from being re-configured by the host (e.g., by the configurator application) at a later time. In one example, a secure storage device 110 does not provide a user-set configuration-ready mode; hence, the secure storage device can be configured by a host only once in an out-of-box mode.

In one or more implementations, each configuration encryption key(s) is generated (e.g., by the security controller 258 (or a microcontroller therein) and the configurator application 222) for each configuration session and for each secure storage device 110 to be configured using a host 120.

In one or more implementations, when a configuration session is terminated, such configuration encryption key(s) are prevented from being stored (and thus are not stored) on the host 120 or the secure storage device 110. For example, such configuration encryption key(s) are erased (e.g., replaced with null key(s)) when a configuration session is terminated. This process improves security associated with the secure storage devices.

While the secure storage device 110 operates in a non-configuration-ready mode (e.g., a normal operating mode), if a user desires to place the secure storage device 110 back into a configuration-ready mode (which may be referred to as a user-set configuration-ready mode for this instance), the user can press the button(s) on the physical input device 246 designated to place the device 110 into a configuration-ready mode, and this causes the security controller 258 (or a microcontroller therein) to set the PIN(s) stored in the device 110 to "null" PIN(s).

In one or more implementations, when the user presses the button(s) designated to place the device 110 into a configuration-ready mode, this causes the security controller 258 (or a microcontroller therein) to reset the encryption key(s), which are stored in the device 110, to new encryption key(s), which may be viewed as crypto-erasing the device 110 (or the memory 232).

In one or more implementations, when the user presses the button(s) designated to place the device 110 into a configuration-ready mode, this causes the security controller 258 (or a microcontroller therein) to set the indication (e.g., a flag in a memory) to indicate that the secure storage device 110 is in a configuration-ready mode. In one or more aspects, a configuration-ready mode indicates that the secure storage device 110 is allowed to communicate with the host 120 to configure the secure storage device 110.

The description below illustrates examples of a process for setting a secure storage device 110 back into a configuration-ready mode.

The security controller 258 (or a microcontroller therein) may receive user input via the physical input device 246 when the secure storage device 110 is determined not to be in the configuration-ready mode. For example, the user input may include a sequence of control signals for causing removal/replacement of at least a part of the configuration data from the secure storage device 110 (e.g., setting the PIN(s) to "null" PIN(s)). In one or more implementations, since the secure storage device is no longer reconfigurable by the host 120 when the secure storage device is not in the configuration-ready mode, the physical input device 246 on the secure storage device 110 may be the remaining means to provide access to the secure storage device 110.

In this respect, a user of the secure storage device may activate a configuration-ready reset feature of the secure storage device 110 by entering a known (or predetermined) entry or sequence of entries via the physical input device 246. For example, the user may press one or more keys or buttons on the physical input device 246 at once for a predefined period of time to trigger the configuration-ready reset feature. In another example, a user may provide a biometric input via the physical input device 246 to trigger the configuration-ready reset feature when the physical input device 246 is an embedded sensor. In yet another example, a user may provide a touch input sequence (e.g., a multi-tap input, a predefined gesture pattern, or the like) via the physical input device 246 to trigger the configuration-ready reset feature when the physical input device 246 is an embedded touchscreen.

In one or more implementations, the security controller 258 (or a microcontroller therein) may cause determining whether a configuration-ready reset operation in the secure storage device 110, based on the received user input, is complete. For example, the security controller 258 (or a microcontroller therein) may scan the secure storage device 110 and confirm that any prior security information is no longer present or valid. Further, the security controller 258 (or a microcontroller therein) may cause a crypto-erase operation of any stored encryption key (e.g., the data transfer encryption key). In some examples, the security controller 258 (or a microcontroller therein), using, for example, an entropy generator, generates a new randomized encryption key(s) (e.g., a handshake key(s)) as part of the crypto-erase operation. The secure storage device 110 then stores an indication that the secure storage device 110 is in a configuration-ready mode when the configuration-ready reset operation is determined to be complete. In this respect, the security controller 258 (or a microcontroller therein) may modify the flag setting to indicate the configuration-ready mode (e.g., setting the configuration-ready flag).

In one or more implementations, a security controller 258 may include multiple microcontrollers and may also include multiple memories.

In one or more implementations, each of the multiple microcontrollers of the security controller 258 may perform one or more of the various functions of the security controller 258 described herein, such as encrypting data to the memory 232, decrypting data from the memory 232, utilizing an encryption engine and a data transfer encryption key for encrypting or decrypting data, performing functions of an entropy generator (which may be a hardware random number generator used in creating a handshake key(s), a configuration encryption key(s), or a data transfer encryption key(s)), generating a new data transfer encryption key (for an out-of-box mode or for a user-set configuration-ready mode), generating a new handshake key(s) (for an out-of-box mode or for a user-set configuration-ready mode), generating a configuration encryption key, setting the configuration data to null configuration data (for an out-of-box mode or for a user-set configuration-ready mode), setting or modifying an indication (e.g., a flag) to indicate whether a secure storage device 110 is in a configuration-ready mode, determining whether a secure storage device 110 is in a configuration-ready mode, initiating a configuration process (or session) with a host, terminating a configuration process (or session) with the host, causing or facilitating the identifier information (e.g., a product ID and a vendor ID) and/or other enumeration information associated with a secure storage device 110 to be transmitted to the host 120, providing the indication whether a secure storage device 110 is in a configuration-ready mode for transmission to the host 120, performing a handshake process with a host, decrypting configuration data from the host, facilitating storing of configuration data, detecting that a secure storage device 110 (or its component(s)) is powered on, communicating with or receiving input from the physical input device 246, and/or communicating with or providing output to the physical output device 244.

In one example, one microcontroller may perform one or more functions of the security controller 258 described herein. In another example, multiple microcontrollers may perform one of the functions of the security controller 258 described herein.

The microcontrollers within the security controller 258 may have different security protection levels. For example, a first microcontroller may have a security level that is higher than the security level of a second microcontroller, and the second microcontroller may have a security level that is higher than the security level of a third microcontroller. In one or more implementations, some or all of the microcontrollers within the security controller 258 may have the same security protection level or different security protection levels.

The microcontrollers within the security controller 258 may be coupled, directly or indirectly, to each other using communication links, such as bidirectional communication links. These microcontrollers may be coupled, directly or indirectly, to the physical input device 246, the physical output device 244, the memory 232, and the communications module 238. In one example, one microcontroller may provide instructions and/or data (e.g., instructions and/or data generated or handled by the microcontroller or stored by the microcontrollers or its associated memory(ies)) to the host via another microcontroller and the communications module 238. In one example, one microcontroller may receive instructions and/or data (e.g., instructions and/or data generated or handled by the host or stored by the host or its associated memory(ies)) via another microcontroller and the communications module 238. In other examples, one or more microcontrollers within the security controller 258 are coupled directly to one or more other microcontrollers but are not coupled directly to yet other one or more microcontrollers.

In one or more examples, the security controller 258 or one or more microcontrollers therein may be coupled to the physical input device 246 and the physical output device 244. In one or more examples, the security controller 258 or one or more microcontrollers therein may receive an input (e.g., one or more PINs, a configuration-ready reset signal or other user input) from the physical input device 246. In one or more examples, the security controller 258 or one or more microcontrollers therein may provide an output (e.g., a signal to emit a light indicating a configuration-ready mode) to the physical output device 244.

In one or more examples, each or some of the microcontrollers may include multiple microcontrollers. In one or more examples, each or some of the microcontrollers may include an encryption engine.

In one or more implementations, a security controller 258 may partition its functions differently using a different number of microcontrollers (e.g., two, three, or more numbers of microcontrollers). Such microcontrollers may have the same or different security levels. In one example, a security controller 258 may be a single microcontroller.

In one or more implementations, a secure storage device 110 stores an encryption key(s) (e.g., a data transfer encryption key(s)), configuration data, and an indication (e.g., a flag) that indicates whether a secure storage device 110 is in a configuration-ready mode. In one or more implementations, the encryption key(s) may include a handshake key(s). In one or more implementations, the encryption key(s) may include a configuration encryption key.

In one or more implementations, a local memory 240 may store some or all of the encryption key(s), configuration data, and an indication of the configuration-ready mode. In one or more implementations, one or more memories within the local memory 240 may store some or all of the foregoing.

Memories may have different security levels. In one example, one or some of the foregoing information may be stored in a memory having a high security level. In one example, other information may be stored in a memory(ies) having a lower security level. In another example, all of the foregoing information may be stored in a memory(ies)

having the same security level. In another example, the forgoing information may be divided up and stored in different memories having different security levels. In one or more examples, encryption keys may be stored in one memory or multiple different memories.

When the local memory 240 has multiple memories and the security controller 258 has multiple microcontrollers, a memory may be associated with its microcontroller. For example, a microcontroller (or each microcontroller) may have its associated memory(ies) for storing instructions/data generated, used, provided, or received by the respective microcontroller.

In one example, the memory(ies) associated with one microcontroller may have a higher security level than the memory(ies) associated with another microcontroller. In one or more other examples, some or all of the memories within the local memory 240 may have the same security protection level or different security protection levels.

In one implementation, configuration data may be stored in a memory associated with a microcontroller that decrypts configuration data from the host. In another implementation, configuration data may be stored in another memory within the local memory 240 or a secure storage device 110. In one or more examples, different parts of the configuration data may be stored in different memories.

In one implementation, an indication of the configuration-ready mode may be stored in a memory associated with a microcontroller that determines whether a device 110 is in a configuration-ready mode. In another implementation, the indication may be stored in another memory within the local memory 240 or a secure storage device 110.

In one or more implementations, the memory 232 or a portion therein may store some or all of the encryption key(s), configuration data, and the indication of the configuration-ready mode.

An encryption key may include one or more keys. An encryption key may be referred to as an encryption/decryption key or a decryption key as the key may be used to encrypt and/or decrypt data. A handshake key may include one or more keys (or one or more encryption keys). An encryption engine may encrypt outgoing messages and/or decrypt incoming messages. An encryption engine may be referred to as an encryption/decryption engine or a decryption engine as the encryption engine can encrypt and/or decrypt data.

Figure 3A:
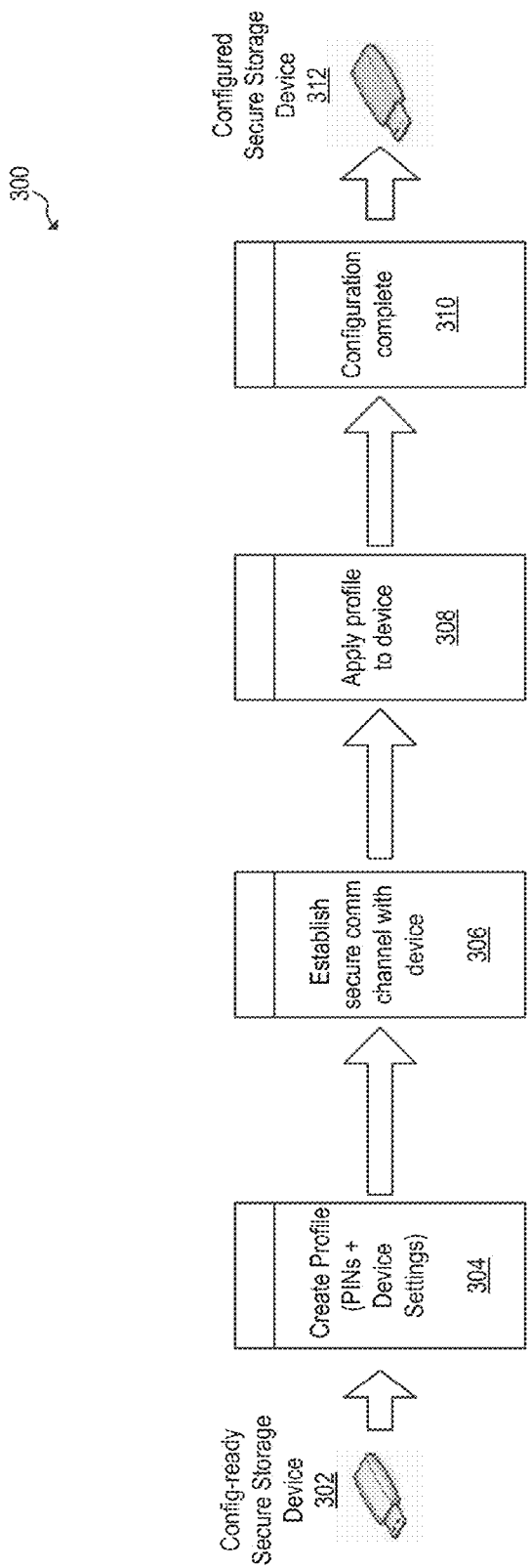
FIG. 3A illustrates an example of an overall process for configuration of secure storage devices using a host.

FIG. 3A illustrates an example of a process 300 for configuration of secure storage devices using the example host of FIG. 2. While FIG. 3A is described with reference to FIG. 2, it should be noted that the process steps of FIG. 3A may be performed by other systems. A configurator application 222 that runs on a computer, such as a personal computer (PC), can configure storage devices via a communication interface such as a USB port. The configurator application 222 can deploy one device or hundreds of secure storage devices. A multitude of secure storage devices can be configured and deployed concurrently (or simultaneously) using the configurator application 222.

The process 300 begins when a secure storage device (e.g., 110) is in a configuration-ready mode and ready for configuration by the host 120. Resulting from the configuration-ready mode in the secure storage device 110, the secure storage device 110 becomes visible to the host 120 on the communication bus 130 and accessible to receive configuration data from the host 120 via the communication bus 130.

The process 300 utilizes a configurator application 222, which is user-friendly. Using the configurator application 222, a user may load secure storage device information (e.g., serial numbers or other information) and settings ahead of time, create configuration profiles, including policies and groups, start plugging in secure storage devices into the host 120, and then auto-configure these secure storage devices. Alternatively, a user can have the configurator application 222 perform these functions as the secure storage devices are plugged into the host 120 and enter the secure storage device information and settings one at a time.

Subsequently, in step 304, the processor 212 of the host 120, e.g., the configurator application 222, generates a configuration profile. For example, the configuration profile may include profile data such as security information (e.g., PINs for administrators and/or users, etc.) and/or configuration setting(s) (e.g., auto-lock, lock-override, self-destruct, etc.). In one or more implementations, once a configuration profile is created, it can be saved and applied again on one or more additional secure storage devices without having to re-create the profile.

Next in step 306, the processor 212 facilitates establishment of a secure communication channel with the secure storage device 110 via the communications module 218 and the communications module 238. The secure communication channel is a conduit for allowing a secure exchange of communications between the host 120 and the secure storage device 110, including a secure handshake and provision of encrypted configuration data from the host 120.

In step 308, the processor 212, e.g., the configurator application 222, applies the configuration profile to the secure storage device(s) 110. The configuration data may include, or may refer to, the configuration profile being applied to the secure storage device(s) 110. The configuration profile is then stored in the secure storage device 110 accessible to the security controller 258 (or a microcontroller therein) of the secure storage device 110. The configuration profile may be encoded with a randomly-generated encryption key that is exclusive to the secure storage device 110. After a configuration file is applied, the processor 212, e.g., the configurator application 222, creates a log of the secure storage device's product information (e.g., a serial number) along with the actual configuration profile for future queries and stores the log in an encrypted database associated with this host 120 (e.g., the memory 220).

Subsequently, in step 310, the configuration of the storage device 110 is completed. In this respect, the indication of the configuration-ready mode is removed from the communication bus 130 (e.g., replaced by an indication that the device 110 is not in a configuration-ready mode) and access to the secure storage device 110 for configuration via the communication bus 130 is blocked. Accordingly, once configured, the secure storage drive 110 is no longer available to the configurator application 222. The device 110 needs to be reset to a configuration-ready state by a user before the device 110 can be configured once again by the configurator application 222.

Next, in step 312, the secure storage device is configured and ready to store secure data in the memory 232 of the secure storage device 110.

Figure 3B:
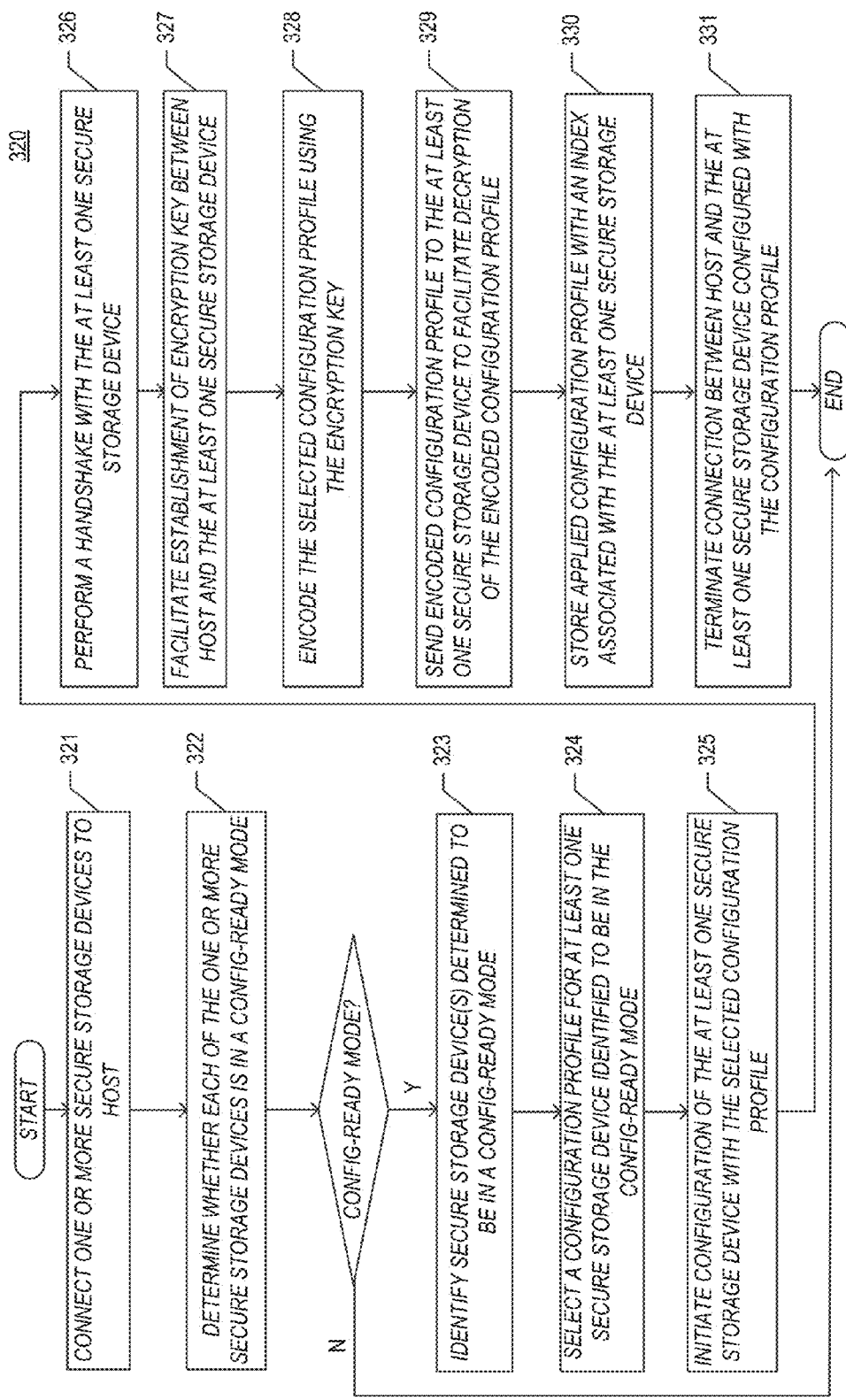
FIG. 3B illustrates an example of a process of a communication exchange between one or more secure storage devices and a host for configuration of secure storage devices.

FIG. 3B illustrates an example of a process 320 of a communication exchange between the secure storage device 110 and host 120 of FIG. 2 for configuration of secure storage devices.

The process 320 begins by proceeding from the start step to step 321 when one or more secure storage devices 110 are connected to the host 120. In this respect, the one or more secure storage devices are connected to a data terminal (e.g., including a communication bus 130 in FIG. 1) that can host an array of secure storage devices 110. The data terminal may include a powered USB bus. In other aspects, the data terminal serves as a passive conduit (or dummy terminal) such that power being applied through the data terminal may originate from the host 120 that is electrically coupled to the data terminal.

Next, in step 322, the processor 212 of the host 120, e.g., the configurator application 222, determines whether each of the one or more secure storage devices 110 is in a configuration-ready mode (e.g., using an indication (or the value of a flag) supplied by each secure storage device). At power-up, the security controller 258 (or a microcontroller therein) of each secure storage device 110 may initiate a sub-process that checks for the current mode of operation of the corresponding secure storage device 110, including checking to see that the secure storage device is in a configuration-ready mode.

Subsequently, in step 323, the processor 212 of the host 120, e.g., the configurator application 222, identifies secure storage device(s) 110 that are determined to be in a configuration-ready mode when the configurator application 222, in step 322, determines that the secure storage device(s) 110 are in the configuration-ready mode. Alternatively, the processor 212, e.g., the configurator application 222, terminates the process 320 by proceeding to the end step when no secure storage devices are determined to be in the configuration-ready mode in step 322.

In step 324, the processor 212, e.g., the configurator application 222, selects a configuration profile for at least one secure storage device 110 identified to be in the configuration-ready mode. The configuration profile may be selected in response to a user of the configurator application 222 providing a user selection of the configuration profile provided for display via a user interface of the configurator application 222.

Next, in step 325, the processor 212, e.g., the configurator application 222, initiates configuration of the at least one secure storage device with the selected configuration profile. In this respect, the processor 212, e.g., the configurator application 222, may gather the configuration data corresponding to the selected configuration profile for provisioning to the secure storage device 110.

In step 326, the processor 212, e.g., the configurator application 222, performs a handshake process with the at least one secure storage device 110. Subsequently, in step 327, the processor 212, e.g., the configurator application 222, facilitates establishment of a configuration encryption key(s) between the host 120 and the at least one secure storage device 110. Next, in step 328, the processor 212, e.g., the configurator application 222, encodes the selected configuration profile using the configuration encryption key.

In step 329, the processor 212, e.g., the configurator application 222, sends the encoded configuration profile to the at least one secure storage device 110 to facilitate decryption of the encoded configuration profile by the secure storage device 110. Using the configuration encryption key established in step 327, the security controller 258 (or a microcontroller therein) can decode/decrypt the received configuration data.

Subsequently, in step 330, the processor 212, e.g., the configurator application 222, stores the applied configuration profile with an index associated with the at least one secure storage device 110. Next, in step 331, the processor 212, e.g., the configurator application 222, facilitates terminating the connection (e.g., terminating the configuration session) between the host 120 and the at least one secure storage device 110 configured with the configuration profile.

When there are multiple secure storage devices that are in a configuration-ready mode, steps 323 to 331 are performed for each of those multiple secure storage devices, where the host, e.g., the configurator application 222, provides to each of the secure storage devices a corresponding configuration profile. One configuration profile may be applied to one or multiple secure storage devices. For example, when a first secure storage device is the same type as a second secure storage device (e.g., a certain flash memory type), the same configuration profile can be used for both storage devices. In another example, even if two storage devices are of the same type, different configuration profiles may be utilized for such devices.

Figure 3C:
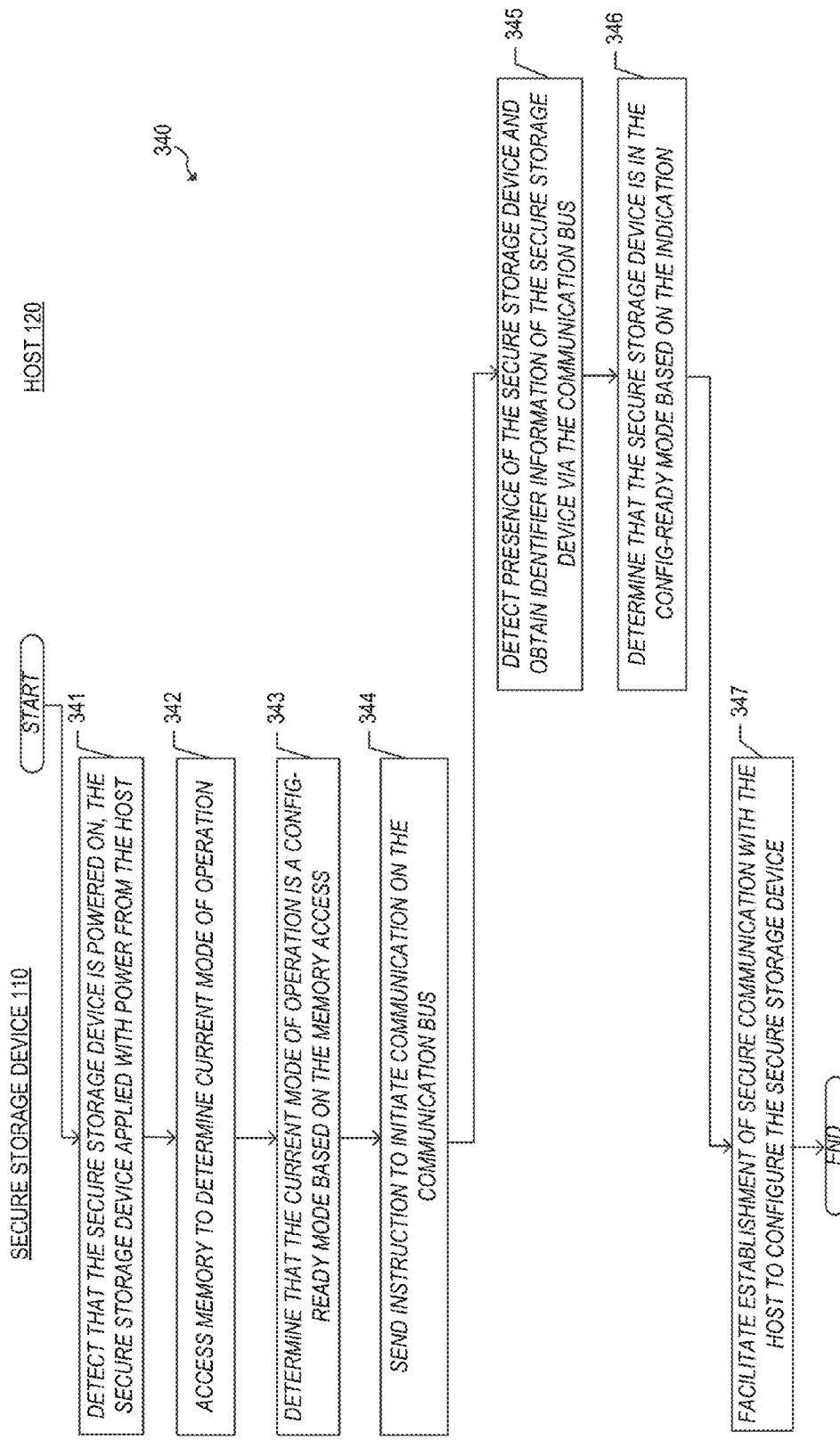
FIG. 3C illustrates an example of a process for establishing a secure connection between a secure storage device and a host.

FIG. 3C illustrates an example of a process 340 for establishing a connection to the example host 120 using the example secure storage device 110 of FIG. 2. While FIG. 3C is described with reference to FIG. 2, it should be noted that the process steps of FIG. 3C may be performed by other systems.

In one or more examples, steps 341-345 of FIG. 3C may relate to step 321 of FIG. 3B, steps 342-346 of FIG. 3C may relate to steps 322 and 323 of FIG. 3B, and step 347 of FIG. 3C may relate to steps 325, 326 and 327 of FIG. 3B.

The process 340 begins in step 341 when the security controller 258 (or a microcontroller therein) of the secure storage device 110, for example, detects that the secure storage device 110 is powered on. In one or more implementations, the secure storage device 110 is applied with power from the host 120 via the communication bus 130. Next, in step 342, the security controller 258 (or a microcontroller therein) accesses the secure storage device 110 or one of its memories to determine a current mode of operation of the secure storage device 110. Step 342 may be performed before, after or concurrently with step 341.

In step 343, the security controller 258 (or a microcontroller therein) determines that the current mode of operation is a configuration-ready mode based on the access of the memory. Step 343 may be performed before, after or concurrently with step 341. In step, 344, the security controller 258 (or a microcontroller therein) sends an instruction to initiate communication on the communication bus 130 (e.g., via another microcontroller in the security controller 258). In one or more implementations, the instruction includes an indication of the configuration-ready mode.

Turning to the host 120, in step 345, the host 120 detects presence of the secure storage device 110 and obtains identifier information of the secure storage device 110 via the communication bus 130. In step 346, the host 120 determines that the secure storage device 110 is in the configuration-ready mode based on the indication provided by the security controller 258 (or a microcontroller therein) that the device 110 is in the configuration-ready mode.

Turning back to the secure storage device 110, in step 347, the secure storage device 110 (together with the host 120) facilitates establishment of a secure communication channel between the host 120 and the secure storage device 110 to configure the secure storage device 110. In this respect, the secure storage device 110 and the host 120 establish configuration encrypting keys for encrypting messages (including the configuration data) to the secure storage device 110 for the configuration process.

Figure 3D:
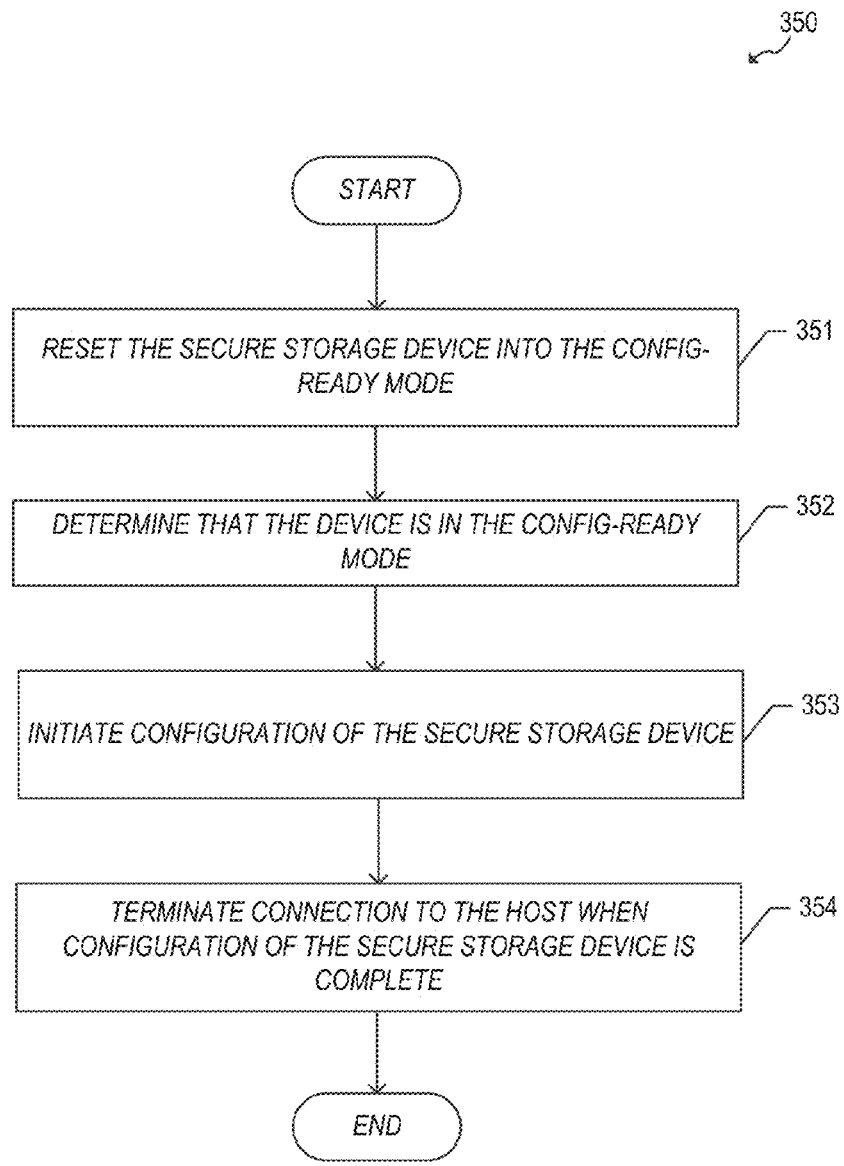
FIG. 3D illustrates an example of a process for reconfiguration of a secure storage device.

FIG. 3D illustrates an example of a process 350 for reconfiguration of the example secure storage device in FIG. 2. While FIG. 3D is described with reference to FIG. 2, it should be noted that the process steps of FIG. 3D may be performed by other systems.

In one or more examples, step 352 of FIG. 3D may relate to step 322 of FIG. 3B and step 343 and 346 of FIG. 3C, step 353 of FIG. 3D may relate to step 325 of FIG. 3B, and step 354 of FIG. 3D may relate to step 331 of FIG. 3B.

The process 350 can be applicable to a secure storage device 110 that has been previously configured (e.g., the device 110 is in a non-configuration-ready mode, where the device 110 already contains a valid PIN(s) to unlock (or to facilitate unlocking) the device after being locked). The process 350 begins by proceeding from the start step to step 351 when the security controller 258 (or a microcontroller therein) of the secure storage device 110 resets the secure storage device 110 into a configuration-ready mode.

In one or more implementations, the secure storage device 110 (e.g., the security controller 258 or a microcontroller therein) receives an input such as a configuration-ready reset signal when an input at the physical input device 246 (e.g., one or more key entries on the keypad) is entered that triggers setting the secure storage device 110 into a configuration-ready mode, including (i) "nullifying" any configuration data (e.g., a reset of the security information and other configuration setting(s)), (ii) creating new encryption key(s) (e.g., a new data transfer encryption key associated with the data transfer to/from a memory (e.g., 232)), and (iii) a reset of the flag setting to indicate that the secure storage device 110 is in the configuration-ready mode. The secure storage device 110 may receive a configuration-ready reset signal during a non-configuration-ready mode. In one or more implementations, the secure storage device 110 may receive a configuration-ready reset signal while the secure storage device 110 is in a locked state. In another implementation, the secure storage device 110 may receive a configuration-ready reset signal while the secure storage device 110 is in an unlocked state.

In one or more other implementations, when a secure storage device 110 is in a non-configuration-ready mode (e.g., the device contains a valid PIN) and is unlocked (e.g., a matching PIN has been entered on the physical input device 246), the secure storage device 110 (e.g., the security controller 258 or a microcontroller therein) may receive an input such as a configuration-ready reset signal via the communication bus from a host 120, and this receipt of the configuration-ready reset signal can initiate resetting the secure storage device 110 into a configuration-ready mode, including (i) "nullifying" any configuration data, (ii) creating new encryption key(s) (e.g., a new data transfer encryption key), and (iii) a reset of the flag setting to indicate that the secure storage device 110 is in the configuration-ready mode.

Subsequently, in step 352, the security controller 258 (or a microcontroller therein) determines that the device is in the configuration-ready mode. In this respect, the security controller 258 (or a microcontroller therein) may scan the secure storage device 110 and determine that the stored flag setting indicates the configuration-ready mode. In this respect, the secure storage device 110 may allow the security controller 258 (or a microcontroller therein) to provide the identifier information (e.g., product ID and vendor ID) and the indication of the configuration-ready mode via the communication module 238 for provision to the communication bus 130.

Next in step 353, the security controller 258 (or a microcontroller therein) initiates configuration of the secure storage device 110. In response to understanding that the secure storage device 110 is in a "configuration-ready state" based on the indication of the configuration-ready mode, the host 120 can begin a secure transfer of new configuration data to the secure storage device 110. In step 354, the security controller 258 (or a microcontroller therein) can send an instruction to terminate the connection to the host 120 (e.g., end this re-configuration session) when the re-configuration of the secure storage device 110 is complete.

Figure 3E:
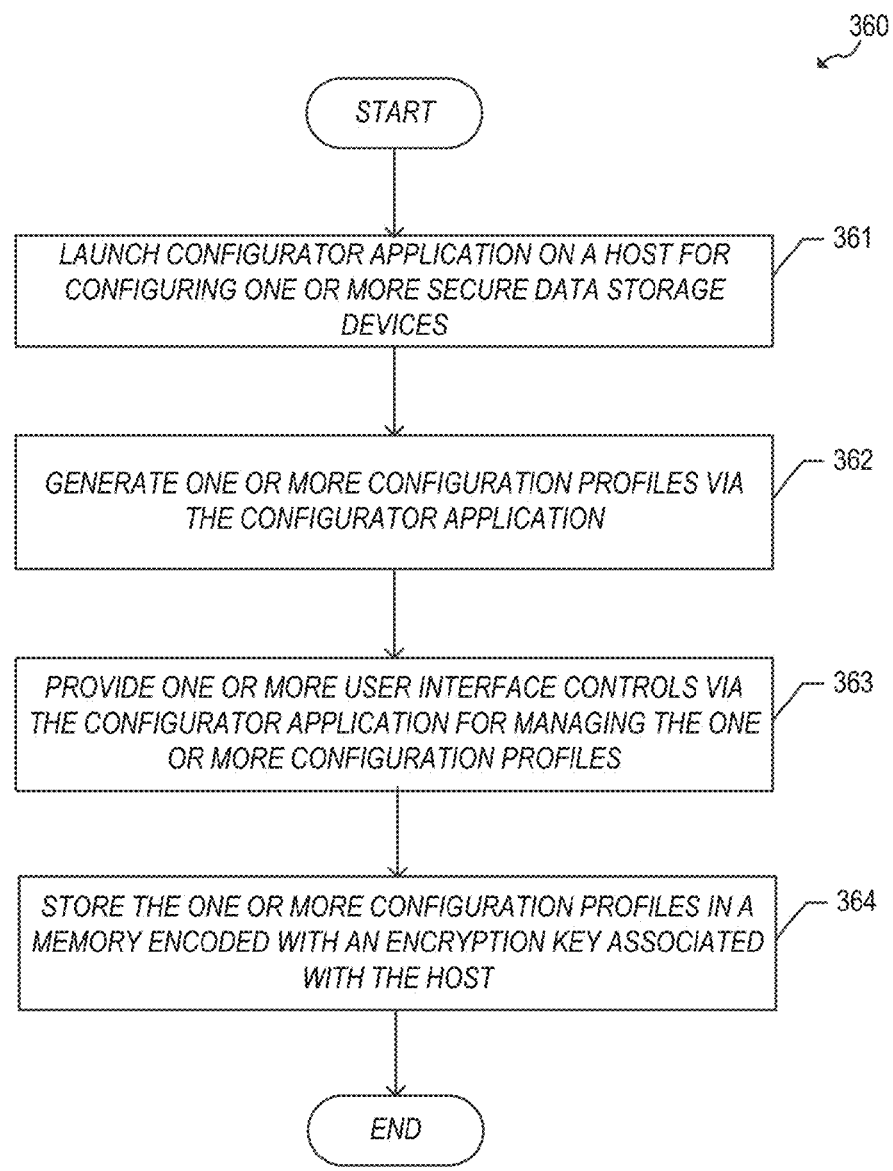
FIG. 3E illustrates an example of a process for creating configuration profile data using a host.

FIG. 3E illustrates an example of a process 360 for creating configuration profile data using the example host in FIG. 2. While FIG. 3E is described with reference to FIG. 2, it should be noted that the process steps of FIG. 3E may be performed by other systems.

In one or more examples, most of the steps of the process 360 may be performed, for instance, in connection with step 324 of FIG. 3B or prior to step 321 of FIG. 3B.

The process 360 begins in step 361 when the processor 212 of the host 120, for example, loads the configurator application 222 on the host 120, and the host 120 receives an input from a user using the input device 216 to initiate generating one or more configuration profiles.

Subsequently, in step 362, the processor 212, e.g., the configurator application 222, generates one or more configuration profiles for configuring the secure storage device 110. Next in step 363, the processor 212, e.g., the configurator application 222, provides one or more user interface controls via the configurator application 222 for managing the one or more configuration profiles.

In step 364, the processor 212, e.g., the configurator application 222, stores the one or more configuration profiles, e.g., encoded with an encryption key, in a memory associated with the host 120. In one or more implementations, the one or more configuration profiles are stored as configuration profile data 260 in the memory 220 or a memory associated with the host.

Figure 3F:
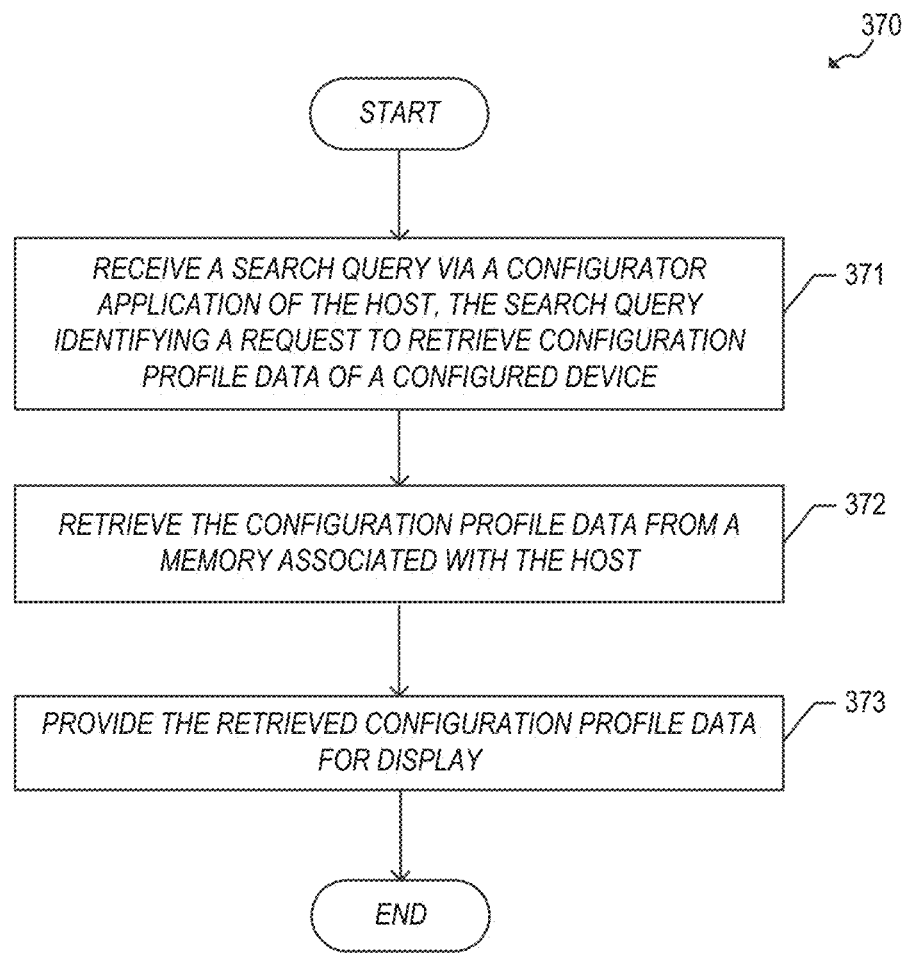
FIG. 3F illustrates an example of a process for querying stored configuration profile data using a host.

FIG. 3F illustrates an example of a process 370 for querying stored configuration profile data using the example host of FIG. 2. While FIG. 3F is described with reference to FIG. 2, it should be noted that the process steps of FIG. 3F may be performed by other systems.

The process 370 begins by proceeding from start step to step 371 when the processor 212 of the 120, e.g., the configurator application 222, receives a search query identifying a request to retrieve, from a memory (e.g., 220), the configuration profile data 260 of a configured device (e.g., secure storage device 110). For example, a user may enter a serial number of a storage device.

Subsequently, in step 372, the processor 212, e.g., the configurator application 222, retrieves the configuration profile data 260 from the memory (e.g., 220) associated with the host 120. Next in step 373, the processor 212, e.g., the configurator application 222, provides the retrieved configuration profile data 260 for display via the output device 214 of the host 120.

In one or more implementations, the process 370 does not involve accessing any secure storage device that is already configured (e.g., a device that contains a valid PIN(s)). The process 370 does not query any secure storage device that is configured. A secure storage device 110 is not connected to the host 120 during the process 370, and the host 120 does not access any secure storage device 110 that is configured. When the host 120 receives a query, it merely accesses its own memory (e.g., 220) or another memory that is accessible by the host where the configuration profile data is stored. However, none of these memories is any memory within a secure storage device that has been configured. Hence, the process 370 does not involve assessing or retrieving any data or information (e.g., any configuration data) from any secure storage device that is configured and locked.

Figure 4A:
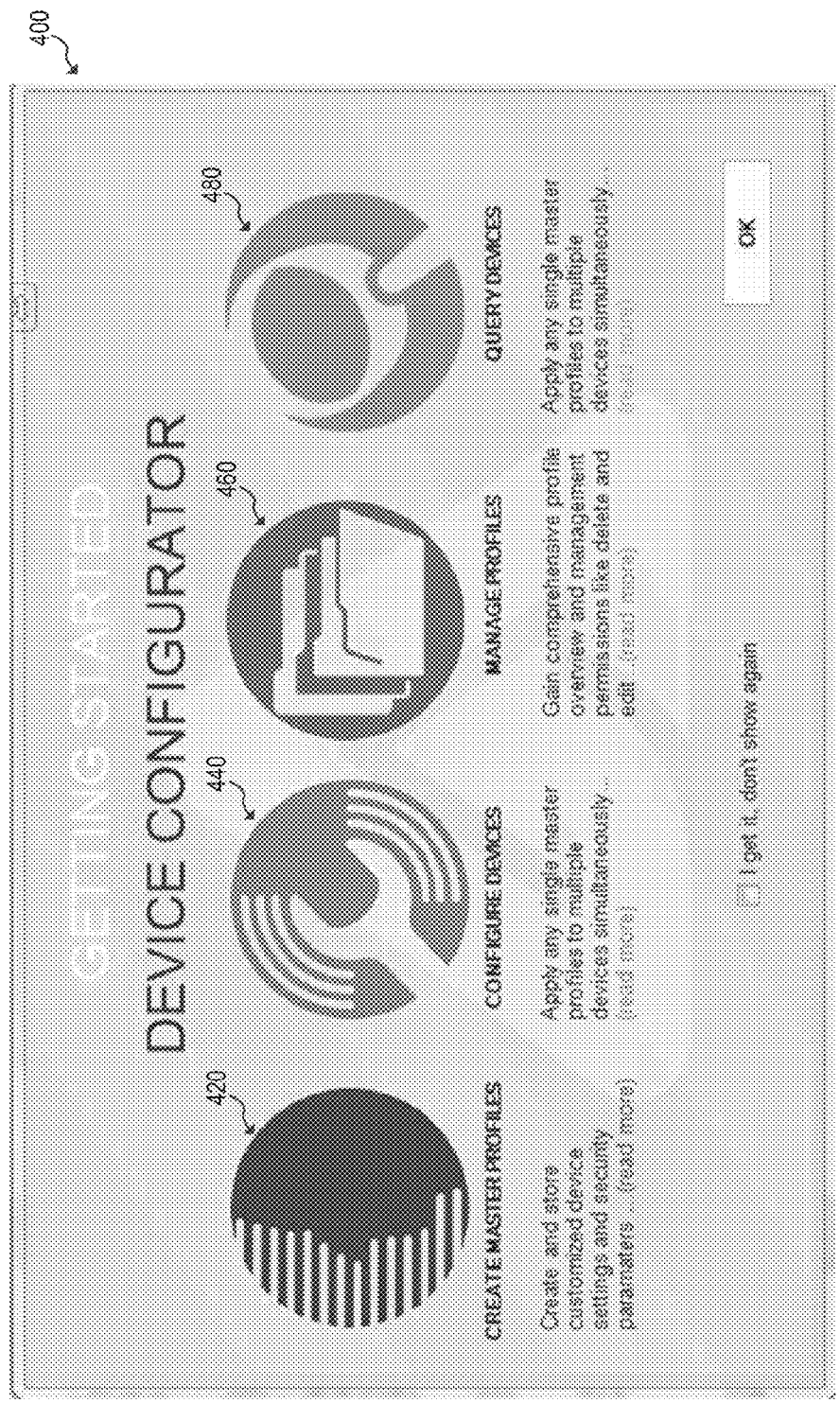
FIGS. 4A through 4E illustrate examples of graphical user interfaces at a host for configuring secure storage devices as well as generating, managing and querying configuration profile data.
Figure 4B:
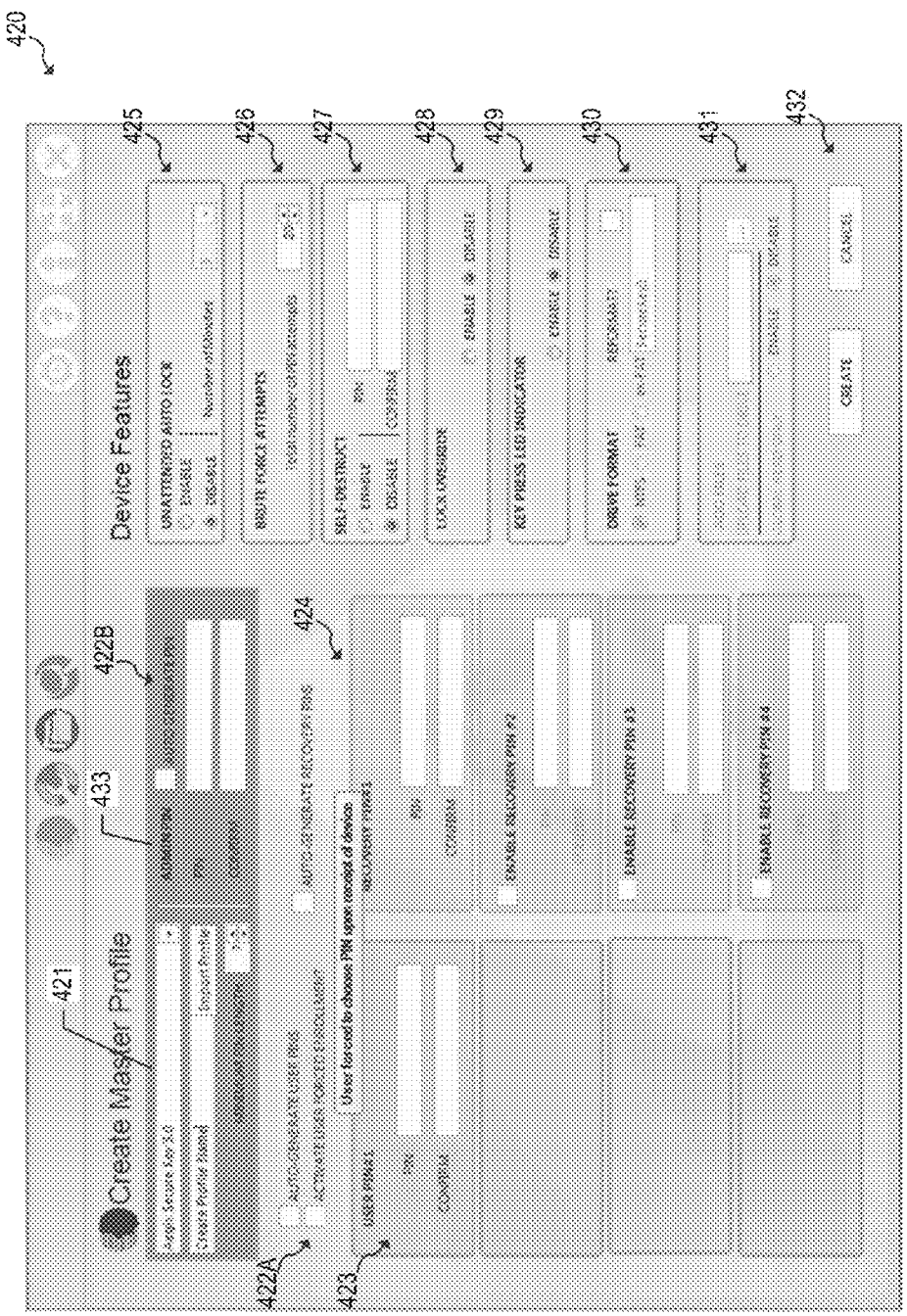
Figure 4C:
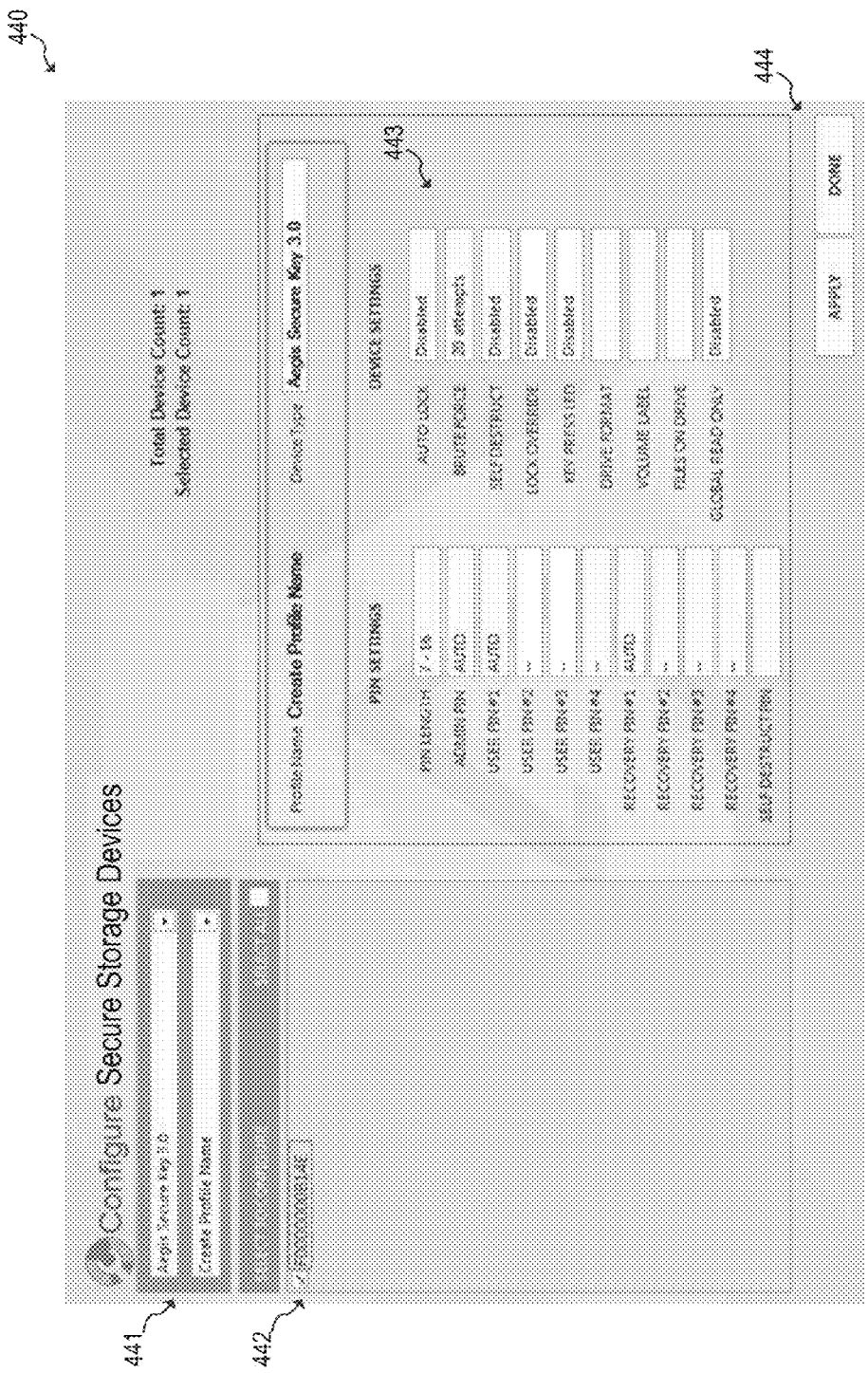
Figure 4D:
Figure 4E:
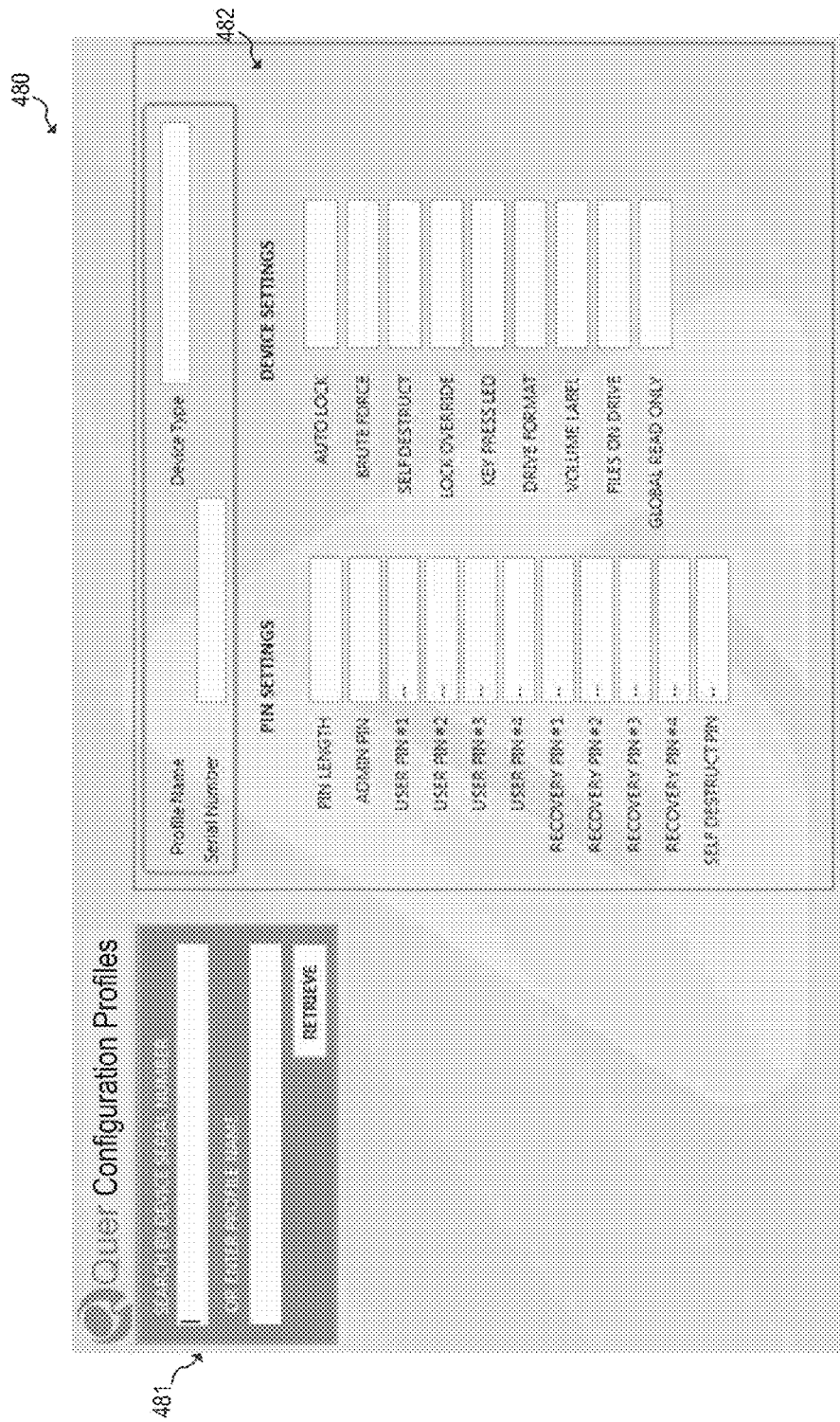

FIGS. 4A through 4E illustrate examples of a host user interface of a configurator application 222 that can be utilized by a host, such as the example host of FIG. 2. FIG. 4A illustrates an example of a user interface 400 of the configurator application 222 running on the host 120 for selecting one of a plurality of sub-processes in the configuration of the secure storage device 110. FIG. 4B illustrates an example of a user interface 420 of the configurator application 222 for creating configuration profiles. FIG. 4C illustrates an example of a user interface 440 of the configurator application 222 for viewing the security information and other settings of configuration profiles before applying a selected configuration profile to the secure storage device 110. FIG. 4D illustrates an example of a user interface 460 of the configurator application 222 for reviewing saved configuration profiles and managing the configuration profiles. FIG. 4E illustrates an example of a user interface 480 of the configurator application 222 for querying one or more of the configuration profiles hosted by the configurator application 222.

Specifically, FIG. 4A illustrates the user interface 400 identifying each of the sub-processes with an individual graphical element and associated description. In one or more implementations, the graphical element for each of the sub-processes is associated with a user interface control for enabling a user of the configurator application 222 to launch the sub-process via the configurator application 222. In FIG. 4A, the user interface 400 lists a first sub-process 420, a second sub-process 440, a third sub-process 460 and a fourth sub-process 480. The user interface 400 is not limited to the sub-processes illustrated in FIG. 4A, and a different number of sub-processes may be provided for display via the user interface 400 depending on implementation.

In one or more implementations, the first sub-process (e.g., 420) relates to creating and storing of customized secure storage device security parameters (e.g., PINs for an administrator, a user and recovery) and other configuration setting(s) (see, e.g., items 425-431 in FIG. 4B). The second sub-process (e.g., 440) may relate to the application of a single configuration profile to multiple secure storage devices 110 simultaneously. The third sub-process (e.g., 460) may relate to providing access to an overview of the stored configuration profiles including access to management permissions to modify the stored configuration profiles. The fourth sub-process 480 may relate to the querying of the configuration profiles stored in a memory associated with a host.

In one or more examples, the first sub-process (e.g., 420) may relate to step 362 of FIG. 3E, the second sub-process (e.g., 440) may relate to step 324 of FIG. 3B, the third sub-process (e.g., 460) may relate to step 363 of FIG. 3E, and the fourth sub-process 480 may relate to FIG. 3F.

FIG. 4B provides an example of the user interface 420 for creating a configuration profile. A configuration profile may be used as a master configuration profile. A configurator application 222 thus allows a user of the configurator application to enter configuration data using a user interface such as the user interface 420.

The user interface 420 includes a profile setting setup feature 421, a PIN setup method feature 422A/422B, an administrator PIN setup feature 433, a user PIN setup feature 423, a recovery PIN setup feature 424, an auto-lock setup feature 425, a brute force attempt setup feature 426, a self-destruct setup feature 427, a lock-override setup feature 428, a visual indicator setup feature 429, a device format setup feature 430, an upload control feature 431, and a user interface control feature 432. FIG. 4B is not limited to the number of setup features illustrated in FIG. 4B, and a different number of setup features may be provided for display via the user interface 420 depending on implementation.

A configurator application 222 can utilize the areas shown in FIG. 4B and configure a profile setting, a PIN setup method, various PINs, an auto-lock feature, a brute force attempt feature, a self-destruct feature, a lock-override feature, a visual indicator feature, a device format feature, an upload control, and a user interface control. A configurator application 222 is not limited to the features described and can include additional features or less number of features.

In the illustration, the profile setting setup feature 421 may include subfields for a device type, a profile name, and the minimum PIN length. In order to set up a configuration profile, one of the listed device types may be selected. This allows creating different security information and configuration settings for different device types. For example, a first type of secure storage device may use only one user PIN, whereas a second type of secure storage device may use four PINs. The minimum PIN length setting may force the length of all PINs to have a minimum digit length, including PINs for a reset or added manually.

The PIN type setup feature 422A/422B includes options to generate PINs automatically by a configurator application or require a user to enter a PIN(s) (e.g., via a keypad on the physical input device 246). The PIN type setup feature allows selecting one or more features of auto-generate administrator PIN, auto-generate user PIN(s), auto-generate recovery PIN(s) or activate user forced enrollment.

In one or more implementations, a user forced enrollment is a mode whereby the secure storage device 110 has already been programmed and has an administrator PIN but requires that the user set up a new PIN (e.g., new user PIN) to access the secure storage device 110. When forced enrollment is activated, the output device 244 may provide one or more visual indications indicating that a new PIN needs to be programmed manually to gain access to the secure storage device 110.

The administrator PIN setup feature 433 includes an option to enter an administrator PIN. The user PIN setup feature 423 includes an option to enter a user PIN. The recovery PIN setup feature 424 includes an option to enter a recovery PIN(s). The user PIN (e.g., 423) and the administrator PIN (e.g., 433) can be configured independently, such that the secure storage device 110 may be unlocked with the administrator PIN or a user PIN. Each auto-generated PIN (e.g., an auto-generated administrator PIN, an auto-generated user PIN and each auto-generated recovery PIN) created for each secure storage device configured with the profile may be unique. In one or more implementations, the auto-generated PINs are encrypted and stored in a data file as part of the configuration profile data 260. In some implementations, each PIN (e.g., an administrator PIN, a user PIN and a recovery PIN) may be manually set. When manually set, the PIN does not change when loaded across all the secure storage devices that are configured with this configuration profile.

The recovery PIN setup feature 424 includes options to manually enter user-generated recovery PINs including option to enable the recovery PIN for launching the user-forced enrollment. In this example, up to 4 recovery PINs may be created. The recovery PIN may not be an actual PIN that unlocks the secure storage device 110, but rather puts the secure storage device 110 into a state of user-forced enrollment where a new user PIN can then be created. The recovery PINs allows a secure storage device 110 that is already configured and has secure data stored thereon to be given to an operator with a recovery PIN such that the operator is allowed to set his or her own user PIN while keeping the secure data secured.

The auto-lock setup feature 425 can set a predefined period of time of inactivity that causes the secure storage device 110 to lock. The secure storage device 110, however, does not lock when data is being written into the memory 232.

The brute force attempt setup feature 426 can set the number of incorrect attempts before the secure storage device 110 erases/replaces the encryption key (e.g., crypto-erase), thus making the data previously stored on the secure storage device 110 unrecoverable.

The self-destruct setup feature 427 allows both an administrator and a user to set a self-destruct PIN when the self-destruct feature is enabled. During a normal operation (e.g., not in the configuration-ready mode), when the self-destruct PIN is entered, the encryption key for the memory 232 may be reset (e.g., reset to a "new" encryption key), rendering the encrypted data previously stored on the memory 232 unrecoverable. In some aspects, the self-destruct PIN replaces any prior existing administrator PIN and becomes the new administrator PIN. It is noted that the self-destruct feature does not place a secure storage device 110 into a configuration-ready mode, as (i) the configuration-ready mode flag is not set, and there is a valid PIN stored in the secure storage device (i.e., the self-destruct PIN becomes the new administrator PIN) that can be used to unlock the device 110 after the device is locked.

The lock-override setup feature 428 allows the secure storage device 110 to stay unlocked during a USB re-enumeration procedure. The lock override may be enabled during a reboot sequence, and using the secure storage device 110 as a boot drive. The secure storage device 110 may remain unlocked in the lock override state as long as the secure storage device 110 remains connected (or plugged) into a USB port. When a USB connection is lost (e.g., the secure storage device 110 is unplugged form the USB port), the secure storage device 110 may become locked.

The visual indicator setup feature 429 may confirm a keypad entry success by causing the output device 244 to provide an output that is recognizable by a user (e.g., light emitted by one or more LEDs in response to a key press, such as a blinking light).

If the device format setup feature 430 is enabled, then after the secure storage device 110 is configured, the device can unlock and reformat (e.g., reformat the memory 232) so that data files can be written into the memory 232.

The upload control 431 provides an option to upload one or more data files from the host 120, for example, as part of the drive format feature. It is noted that data files may be any type of files (e.g., program files, images, videos, audios, documents, etc.).

The user interface control 432 provides a control to confirm creation of the configuration profile, thereby storing the configuration profile in a memory of the host 120 (e.g., as part of the configuration profile data 260).

When the host 120 provides, to the secure storage device 110, encrypted configuration data, such as the security information (e.g., the administrator, user and recovery PINs) and other configuration setting(s) (e.g., the settings for the device features 425-430), the security controller 258 (or a microcontroller therein) may decrypt the configuration data using the configuration encryption key and store the configuration data in the secure storage device 110.

In one or more implementations, configuration data may include security information and other configuration setting(s). The security information may include, for example, an administrator PIN (see, e.g., 433), a user PIN (see, e.g., 423), one or more recovery PINs (see, e.g., 424), and/or a self-destruct PIN (see, e.g., 427). Other configuration settings may include, for example, an auto-lock setting (see, e.g., 425), a brute force attempts setting (see, e.g., 426), a self-destruct setting (see, e.g., 427), a lock-override setting (see, e.g., 428), a key press LED indicator setting (see, e.g., 429), a drive format setting (see, e.g., 430), and/or an add files setting (see, e.g., 431). The default settings of these configuration setting may be, for example, as follows:

default auto-lock setting: disable
default brute force attempts setting: 20
default self-destruct setting: disable
default lock-override setting: disable
default key press LED indicator setting: disable
default drive format setting: NTFS
default add files setting: disable In one or more implementations, these PINs and configuration settings are examples, and configuration data is not limited to these examples. In one or more implementations, configuration data may include only some of these, does not include any of these, and/or may include other types of security information and/or data.

FIG. 4C provides an example of the user interface 440 for viewing a configuration profile and applying a selected configuration profile to the secure storage device 110. The user interface 440 includes a search query input feature 441, a search query result 442, a configuration profile output report 443, and a user interface control 444. The user interface 440 allows a user of the configurator application 222 to review the settings for each secure storage device before having the configuration profile applied to the secure storage device 110.

FIG. 4D provides an example of the user interface 460 for managing the configuration profiles. The user interface 460 includes a configuration profile interface 461, a configuration profile index hierarchy 462 (e.g., by device type), and a user interface control 463. The user interface 460 allows a user of the configurator application 222 to review stored configuration profiles (e.g., stored in a memory of a host), edit the profiles and manage the profiles. This feature does not access any secure storage device that has been configured.

FIG. 4E provides an example of the user interface 480 for querying one or more of the configuration profiles. The user interface 480 includes a search query input field 481 and a search query results page 482. In one or more implementations, the user interface 480 allows a user of the configurator application 222 to lookup the configuration settings that were originally programmed on a secure storage device (e.g., 110) by accessing a memory of the host 120 without accessing the secure storage device that has been configured.

The descriptions below illustrate examples of various features that may be implemented by a secure storage device 110 (for example, in conjunction with a configurator application 222 for some features) in one or more examples.

In one or more implementations, a secure storage device 110 may be implemented with and include one or more of the following features: a hardware encrypted USB 3.0 flash drive; on-the-fly hardware encryption; software-free installation and operation; completely cross-platform compatible in one or more implementations; high-quality rugged aluminum housing; water and dust resistant; embedded 7-16 digit PIN authentication; no security parameters shared with hosts in one or more implementations; programmable minimum PIN length; an administrator mode for secure deployment; independent user and administrator PINs; recovery PINs in case of a forgotten PIN; an administrator forced enrollment at first use; a user forced enrollment option; a tough epoxy internal filling for physical-attack protection; a brute-force protection; a self-destruct PIN feature; compatible with any operating system (OS) such as Windows®, Mac® and Linux; super-fast USB 3.0; 10× faster than USB 2.0; a variable timing circuit(s); a lock-override mode; a drive-reset feature; an auto-lock feature; two read-only modes; and/or configurable. These features are examples, and the subject technology is not limited to these examples.

In one or more implementations, a secure storage device 110 may be implemented with and include one or more of the following features to provide advanced data protection. These features are examples, and the subject technology is not limited to these examples.

One or more implementations that are software-free, cross-platform compatible, configurable, and having a host of high-level security features packed into a flash-key.

Military grade hardware encryption: In one or more implementations, a secure storage device encrypts all data (e.g., all data to a mass storage memory within the secure storage device) on-the-fly.

Software-free design: In one or more implementations, a secure storage device can be used right out of the box—no software, no drivers, no updates are needed. A secure storage device can be utilized where no separate input device (e.g., a keyboard) is present. In one or more implementations, a secure storage device is completely cross-platform compatible (e.g., PCs, Mac®, Linux, or any OS with a powered USB port and a storage file system), and a secure storage device excels virtually anywhere.

Host-free design: In one or more implementations, no host control or input is needed for a secure storage device's normal operation or management (e.g., to lock the device, unlock the device, authenticate the device, or encrypt/decrypt data to/from a mass storage memory), and no software on the host is needed for the device's normal operation or management (e.g., to lock the device, unlock the device, authenticate the device, or encrypt/decrypt data to/from a mass storage memory). In one or more implementations, a secure storage device is self-authenticated using its own input device and its own controller, all of which reside within or on the secure storage device itself (rather than within or on another device such as the host). In one or more implementations, during a normal operation (e.g., a non-configuration-ready mode), a secure storage device (e.g., its own input device), rather than a host, receives a valid new PIN(s) for the device from a user. In one or more implementations, during a normal operation, a secure storage device receives a PIN (e.g., by its own input device) and processes the PIN (e.g., by its own controller) to unlock the device without any input, instructions or data from a host; thus the device rather than the host receives and processes the PIN.

Configurable: Custom profiles and mass configure multiple secure keys can be created at once with the configurator application/a powered hub bundle.

Embedded keypad: All PIN entries and controls are performed on the keypad of a secure storage device. In one or more implementations, no critical security parameters are ever shared with the host computer. In one or more implementations, since there is no host involvement in the key's authentication or operation, the risk of software hacking and key-logging is circumvented (or completely circumvented).

Super tough, inside and out: A secure storage device's rugged, extruded aluminum casing and wear-resistant keypad is resistant to dust and water. Inside, another layer of protection is added by encasing the inner componentry with a hardened epoxy compound to prevent physical access to the encryption circuitry.

Independent user and administrator PINs: A secure storage device can be configured with independent user and administrator PINs, making it an optimal device for corporate and government deployment. Should a user forget a user PIN, the secure storage device can still be unlocked with the administrator PIN and a new user PIN can be created.

One-time recovery PINs: In the event that a user PIN is forgotten, multiple (e.g., four one-time recovery PINs) can be programmed to permit access to the secure storage device's data.

Auto-lock feature: In one or more implementations, a secure storage device can automatically lock whenever the device is unplugged from its port (e.g., powered USB port), and is further programmable to lock after a predetermined period of inactivity.

Drive reset feature: This feature allows a secure storage device to be cleared and redeployed. Capable of generating an infinite number of randomly generated encryption keys, a secure storage device can be reset as many times as desired.

Brute-force protection: In one or more implementations, after a predetermined number (programmable, and for example up to twenty) of incorrect PIN entry attempts, a secure storage device determines that it is under brute force attack and responds by performing a crypto-erase, deleting the encryption key which renders all of the secure storage device's data (e.g., data in the mass storage memory of the secure storage device) useless.

Variable time circuit technology: This technology is designed to thwart timing attacks aimed at accessing the secure storage device by studying usage patterns and infiltrating the secure storage device's electronics.

Lock-override mode feature: In one or more implementations, a secure storage device is allowed to designate specific cases in which the device needs to remain unlocked, e.g., during reboot, passing the device through a virtual machine, or other similar situations that would normally prompt the device to automatically lock. When enabled, the lock-override mode allows the device to remain unlocked through communication re-enumeration (e.g., USB port re-enumeration) and does not re-lock until the power (e.g., USB power) is interrupted.

Read-only mode feature: In one or more implementations, accessing data on the secure storage device is allowed in a public setting while protecting against viruses (e.g., USB viruses). Read-only mode is useful for applications that require data to be preserved in its original, unaltered state and cannot be overwritten or modified.

Self-destruct feature: In one or more implementations, this allows the last line of defense for data security where all of the secure storage device's contents (e.g., data in the mass storage memory of the secure storage device) need to be wiped to avert breach. In one or more implementations, a secure storage device's self-destruct PIN defends against physically compromising situations by erasing the secure storage device's contents, leaving it in normal working order and to appear as if the device has yet to be deployed.

In one or more implementations, a secure storage device 110 may be implemented with and include one or more of the following features. These features are examples, and the subject technology is not limited to these examples.

Easy to use onboard keypad: A secure storage device can be unlocked with unique 7 to 16-digit pin. A secure storage device may have wear-resistant keys to obscure use.

Programmable minimum PIN length: For added PIN length and enhanced security, the minimum PIN length requirement can be increased from 7 characters up to 16 maximum.

On-the-fly hardware encryption: In one or more implementations, all data (e.g., data to be stored on a memory 232) is hardware-encrypted on-the-fly with military-grade, full-disk encryption.

Software-free/cross-platform compatible: In one or more implementations, no software is necessary to set up or operate a secure storage device, and the device is completely cross-platform compatible and optimal for corporate deployments.

Forced-enrollment/user forced enrollment: In one or more implementations, for added security, a secure storage device requires that an administrator creates a unique PIN upon first use and additionally allows forced enrollment feature to be extended to a user PIN setup.

Administrator mode: In one or more implementations, a secure storage device allows enrollment of one independent user and one administrator for setting parameters for PIN management, read-only, auto-lock, self-destruct, lock-override, and brute force.

Secure storage device-reset feature: In one or more implementations, a secure storage device allows an infinite number of resets and performs a crypto-erase with new encryption key regeneration.

Auto-lock feature: A secure storage device automatically locks after a predetermined period of inactivity or whenever the device is unplugged from its powered communication port (e.g., USB port) or if power to the port (e.g., USB port) is turned off.

Internally sealed by tough epoxy compound filling: In one or more implementations, the internal components of a secure storage device are sealed by a super-tough epoxy compound barrier, which prevents would-be hackers from physically accessing the encryption circuitry.

OS and platform independent: A secure storage device is compatible with Windows®, Mac®, Linux and embedded systems and works with any other devices such as USB/USB on-the-go devices.

Advanced options/modes: A secure storage device may include two read-only modes, lock-override mode, and a self-destruct feature with a self-destruct PIN.

LED flicker button confirmation: A secure storage device may include an indicator that indicates a positive button entry with visual LED confirmation.

Recovery PINs: A secure storage device may allow multiple (e.g., four) one-time use PINs to recover data in cases of forgotten user/administrator PINs.

USB 3.0 Interface: A secure storage device may be compatible with any computer USB port or any USB/USB on-the-go devices.

Aluminum enclosure: A secure storage device may include dust and water resistant durable aluminum housing.

Secure storage device capacities: In one or more examples, a secure storage device (e.g., memory 232) may include 8 GB, 16 GB, 32 GB, or 64 GB.

Plug-n-play and compatible on any system: A secure storage device may work with Windows®, Mac®, Linux, Android and Symbian systems, or any powered USB OS with a storage file system.

Secure storage: A secure storage device may be used for government, health care, insurance companies, financial institutions, human resource departments, and executives with sensitive data.

Data transfer rates: In one or more examples, a secure storage device may support 190 MB/s (read)/80 MB/s (write)|small file (4K): 16 MB/s read; 33 MB/s write.

Interface: A secure storage device may support USB 3.0.

FIG. 5 is a block diagram illustrating an exemplary computer system 500 with which the host 120 of FIG. 1 can be implemented. In certain aspects, the computer system 500 may be implemented using hardware or a combination of software and hardware, in a dedicated client device, integrated into another entity, or distributed across multiple entities.

The computer system 500 (e.g., host 120) includes a bus 508 or other communication mechanism for communicating information, and a processor 502 (e.g., processor 212) coupled with the bus 508 for processing information. By way of example, the computer system 500 may be implemented with one or more processors 502. A processor 502 may be a general-purpose microprocessor, a microcontroller, a digital signal processor, an application specific integrated circuit, discrete hardware components, or any other suitable hardware that can perform calculations or other manipulations of information.

The computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a random access memory (RAM), a flash memory, registers, a hard disk, a removable disk or any other suitable storage device, for storing information and instructions to be executed by a processor 502.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art. The memory 504 may also be used for storing temporary variable or other intermediate information during execution of instructions to be executed by the processor 502.

A computer program as discussed herein does not necessarily correspond to a file in a file system. A computer program can be deployed to be executed on one computer or on multiple computers that are located at one site or distributed across multiple sites and interconnected by a communication network. The processes and logic flows described in this disclosure can be performed by one or more programmable processors executing one or more computer programs to perform functions by operating on input data and generating output.

The computer system 500 further includes a data storage unit 506 such as a magnetic disk or optical disk, coupled to bus 508 for storing information and instructions. The computer system 500 may be coupled via an input/output module 510 to various devices. Exemplary input/output modules 510 include data ports such as USB ports. The input/output module 510 is configured to connect to a communications module 512. Exemplary communications modules 512 (e.g., communications modules 218) include a USB interface and networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device. Other kinds of input devices 514 can be used, such as a tactile input device, visual input device, audio input device, or brain-computer interface device. Exemplary output devices 516 include display devices, such as a liquid crystal display (LCD) monitor, for displaying information to the user.

According to one aspect of the present disclosure, a computing device (e.g., 500, 120, 110, 200) can be implemented using a computer system in response to a processor (e.g., 502, 212, 258, or a sub-component) executing one or more sequences of one or more instructions contained in a memory (e.g., 504, 220, 240). Such instructions may be read into the memory (e.g., 504, 220, 240) from another machine-readable medium, such as a data storage unit (e.g., 506, 232). Execution of the sequences of instructions contained in the memory (e.g., 504, 220, 240) causes the processor (e.g., 502, 212, 258, or a sub-component) to perform the process steps described herein. One or more processors in a multi-processing arrangement may also be employed to execute the sequences of instructions contained in the memory (e.g., 504, 220, 240). In some aspects, hard-wired circuitry may be used in place of or in combination with software instructions to implement various aspects of the present disclosure. Thus, some aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

The term "machine-readable storage medium" or "computer readable medium" as used herein refers to any medium or media that participate in providing instructions to a processor (e.g., 502, 212, 258 or a sub-component) for execution. Such a medium may take many forms, including, but not limited to, non-volatile media and volatile media. Non-volatile media include, for example, optical or magnetic disks, such as a data storage unit (e.g., 506, 232). Volatile media include dynamic memory, such as a memory 504. Common forms of machine-readable media include, for example, a flexible disk, a hard disk, a magnetic medium, a CD-ROM, DVD, any other optical medium, a RAM, a PROM, an EEPROM, a FLASH EPROM or any other medium from which a computer can read. The machine-readable storage medium can be a machine-readable storage device, a machine-readable storage substrate, a memory device, or a combination of one or more of them.

Various examples of aspects of the disclosure are described below as clauses for convenience. These are provided as examples, and do not limit the subject technology.

Clause A. A secure storage device (e.g., 110), comprising: a casing; a memory disposed within the casing and configured to store secure data; a physical key input device disposed at an outer surface of the casing and configured to receive a security identification code from a user to facilitate authentication and unlocking of the secure storage device; a communication interface configured to connect the secure storage device to a communication bus external to the casing; and a controller disposed within the casing and coupled to the memory and the physical key input device, the controller configured to cause: determining whether the secure storage device is in a configuration-ready mode, the configuration-ready mode indicating that the secure storage device is allowed to communicate with a host, which is external to the secure storage device, to configure the secure storage device; and receiving configuration data from the host via the communication bus for configuring the secure storage device when the secure storage device is determined to be in the configuration-ready mode, the secure storage device being prevented from receiving the configuration data from the host when the secure storage device is determined not to be in the configuration-ready mode.

Clause B. Wherein an indication whether the secure storage device is in the configuration-ready mode is contained within the secure storage device, and Clause C. Wherein prior to receiving the configuration data from the host, when the secure storage device is in the configuration-ready mode and contains a security identification code, the security identification code contained in the secure storage device is a null security identification code that is unusable to facilitate unlocking the secure storage device after the secure storage device is locked.

Clause D. Wherein prior to receiving the configuration data from the host, when the secure storage device is in the configuration-ready mode and contains a security identification code, the security identification code contained in the secure storage device is a null security identification code, at least a portion of which is not enterable via the physical key input device.

Clause E. Wherein the secure storage device (e.g., the controller) is configured to store the configuration data received from the host to configure the secure storage device with the configuration data received from the host.

Clause F. Wherein after the secure storage device is configured with the configuration data from the host, the secure storage device is prevented from re-configured by the host when the secure storage device contains a security identification code usable to unlock the secure storage device.

Clause G. Wherein when the secure storage device is set to a second configuration-ready mode after a non-configuration-ready mode, the secure storage device is configured to use a second handshake key and a second configuration encryption key that are different from the handshake key and the configuration encryption key used for a first configuration-ready mode.

Clause H. A method for facilitating configuration of a secure storage device (e.g., 110) in a configuration-ready mode, the method comprising: determining whether at least a secure storage device, which is external to a host, is in a configuration-ready mode, the configuration-ready mode indicating that the host is allowed to communicate with the secure storage device to configure the secure storage device;

and providing, for transmission to the secure storage device, configuration data for configuring the secure storage device when the secure storage device is, or is determined to be, in the configuration-ready mode, the host being prevented from configuring the secure storage device when the secure storage device is not, or is determined to be not, in the configuration-ready mode.

Clause I. The method comprising: prior to providing the configuration data, selecting a configuration profile for the secure storage device when the secure storage device is, or is determined to be, in the configuration-ready mode.

Clause J. The method comprising: prior to providing the configuration data, facilitating a handshake with the secure storage device based on a handshake key.

Clause K. The method comprising: prior to providing the configuration data, facilitating establishment of a configuration encryption key for the configuration data.

Clause L. The method comprising: prior to providing the configuration data, encrypting the configuration data using the configuration encryption key.

Clause M. Wherein the handshake key is different from the configuration encryption key.

Clause N. Wherein when the secure storage device is set to a second configuration-ready mode after a non-configuration-ready mode, the host is configured to use a second handshake key and a second configuration encryption key that are different from a handshake key and a configuration encryption key used for a first configuration-ready mode.

Clause O. The method comprising: storing the selected configuration profile.

Clause P. The method comprising: facilitating termination of communication with the secure storage device.

Clause Q. A computer-readable storage medium (e.g., 220, one or more memories, one or more registers, and/or one or more media) storing instructions that, when executed by one or more processors (e.g., 212), cause one or more processors to perform the method described in any of Clauses H-P or any of other operations described herein.

Clause O. A computer-readable storage medium (e.g., 240, 232, one or more memories, one or more registers, and/or one or more media) storing instructions that, when executed by one or more processors (e.g., 258), cause one or more processors to perform the method described in any of Clauses A-G or any of other operations described herein.

In one or more aspects, additional clauses are described below.

A method comprising one or more methods or operations described herein.

An apparatus comprising one or more memories (e.g., 240, 232, 220, one or more memories, or one or more registers) and one or more processors (e.g., 258, 212) coupled to the one or more memories, the one or more processors configured to cause the apparatus to perform one or more methods or operations described herein.

A hardware apparatus comprising circuits (e.g., 258, 212) configured to perform one or more methods, operations, or portions thereof described herein.

An apparatus comprising means (e.g., 258, 212) adapted for performing one or more methods or operations described herein.

A computer-readable storage medium (e.g., 240, 232, 220, one or more memories, one or more registers, and/or one or more media) comprising instructions stored therein, the instructions comprising code for performing one or more methods or operations described herein.

A computer-readable storage medium (e.g., 240, 232, 220, one or more memories, one or more registers, and/or one or more media) storing instructions that, when executed by one or more processors (e.g., 258, 212), cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more sentences, one or more phrases, one or more paragraphs, and/or one or more claims. A clause or a claim may have multiple dependencies based on any of the other clauses or claims.

An example of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other examples, some of these operations may be performed by specific hardware components that contain hardwired logic. Those operations may alternatively be performed by any combination of programmed data processing components and fixed hardwired circuit components.

In some cases, an example of the present disclosure may be an apparatus (e.g., a secure flash storage device) that includes one or more hardware and firmware/software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

To illustrate the interchangeability of hardware, firmware and software, items such as the various illustrative blocks, modules, components, methods, operations, instructions, and algorithms have been described generally in terms of their functionality. Whether such functionality is implemented as hardware, firmware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, contain or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions. The term coupling, connecting, or the like is intended to include direct and indirect coupling and direct and indirect connecting. The term coupled, connected, or the like is intended to include directly and indirectly coupled and directly and indirectly connected.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. Unless explicitly stated otherwise, these may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A secure storage device, comprising:
   a casing;
   a memory disposed within the casing and configured to store encrypted data;
   a physical input device disposed at an outer surface of the casing and configured to facilitate unlocking of the secure storage device; and
   a controller disposed within the casing and coupled to the memory and the physical input device, the controller configured to cause:
      determining whether the secure storage device is in a configuration-ready mode, the configuration-ready mode indicating that the secure storage device is allowed to communicate with a host, which is external to the secure storage device, to configure the secure storage device; and
      receiving configuration data from the host for configuring the secure storage device when the secure storage device is determined to be in the configuration-ready mode, the secure storage device being prevented from receiving the configuration data from the host when the secure storage device is determined to be not in the configuration-ready mode,
   wherein the controller is configured to cause:
      prior to determining whether the secure storage device is in the configuration-ready mode, setting the secure storage device into the configuration-ready mode, and
   wherein setting the secure storage device into the configuration-ready mode comprises:
      setting an encryption key in the secure storage device, wherein when the secure storage device contains data stored prior to setting the encryption key, the encryption key is unusable for decrypting the data stored prior to setting the encryption key.

2. The secure storage device of claim 1, wherein prior to receiving the configuration data from the host, at least a portion of a security identification code contained in the secure storage device is not enterable via the physical input device.

3. The secure storage device of claim 1, wherein setting the secure storage device into the configuration-ready mode comprises:
  setting an indication in the secure storage device to indicate that the secure storage device is in the configuration-ready mode.

4. The secure storage device of claim 1, wherein the controller is configured to cause:
  receiving an input via the physical input device when the secure storage device is not in the configuration-ready mode,
  wherein based on the input, the controller is configured to place the secure storage device into the configuration-ready mode.

5. The secure storage device of claim 4, wherein the controller is configured to cause:
  in response to the input, setting a null security identification code in the secure storage device, wherein at least a portion of the null security identification code is not enterable via the physical input device.

6. The secure storage device of claim 1, wherein prior to receiving the configuration data from the host, when the secure storage device is in the configuration-ready mode, the secure storage device contains no security identification code that is usable to unlock the secure storage device after the secure storage device is locked.

7. The secure storage device of claim 1, wherein when the secure storage device is determined to be in the configuration-ready mode, the controller is configured to send an instruction prior to receiving the configuration data from the host, the instruction for providing identifier information associated with the secure storage device to the communication interface for provision to the host.

8. The secure storage device of claim 7, wherein the identifier information comprises a product identifier and a vendor identifier of the secure storage device, and
  wherein in response to a query from the host, the controller is configured to provide, for transmission to the host, an indication whether the secure storage device is in the configuration-ready mode.

9. The secure storage device of claim 1, comprising:
  an output device disposed at the outer surface of the casing and configured to display an indication of a mode of operation of the secure storage device,
  wherein the indication of the mode of operation includes a signal indicating the configuration-ready mode when the secure storage device is in the configuration-ready mode.

10. The secure storage device of claim 1, wherein an indication whether the secure storage device is in the configuration-ready mode is contained within the secure storage device.

11. The secure storage device of claim 1, wherein prior to receiving the configuration data from the host, when the secure storage device is in the configuration-ready mode and contains a security identification code, the security identification code contained in the secure storage device is a null security identification code that is unusable to facilitate unlocking the secure storage device after the secure storage device is locked.

12. The secure storage device of claim 11, wherein prior to receiving the configuration data from the host, when the secure storage device is in the configuration-ready mode and contains another security identification code, the another security identification code contained in the secure storage device is another null security identification code that is unusable to create a new security identification code to unlock the secure storage device after the secure storage device is locked.

13. A secure storage device, comprising:
  a housing;
  a memory disposed within the housing and configured to store secure data;
  a physical input device disposed at an outer surface of the housing and configured to facilitate unlocking of the secure storage device; and
  a controller disposed within the housing and coupled to the memory and the physical input device, the controller configured to cause:
    determining that the secure storage device is in a configuration-ready mode, the configuration-ready mode indicating that the secure storage device is allowed to communicate with a host, which is external to the secure storage device, to configure the secure storage device; and
    receiving configuration data from the host for configuring the secure storage device when the secure storage device is in the configuration-ready mode, the secure storage device being prevented from receiving the configuration data from the host when the secure storage device is not in the configuration-ready mode,
  wherein when the secure storage device is in the configuration-ready mode, the controller is configured to cause:
    prior to receiving the configuration data, facilitating establishment of a configuration encryption key for the configuration data;
    after receiving the configuration data, decrypting the configuration data based on the configuration encryption key;
    storing the configuration data in the secure storage device; and
    setting the secure storage device into a non-configuration-ready mode, and
  wherein the configuration encryption key is different from a data transfer encryption key for encrypting data to the memory or decrypting data from the memory.

14. The secure storage device of claim 13, wherein the controller is configured to cause:
  ending communication with the host when the configuration of the secure storage device is completed; and
  preventing a new configuration of the secure storage device by the host subsequent to ending the communication with the host, based on an indication that the secure storage device is not in the configuration-ready mode.

15. The secure storage device of claim 13, wherein when the secure storage device is in the configuration-ready mode, the controller is configured to cause:
  prior to receiving the configuration data, facilitating a handshake process with the host,
  wherein when the secure storage device is set to a second configuration-ready mode after the non-configuration-ready mode, the secure storage device is configured to use a second configuration encryption key that is different from the configuration encryption key.

16. A method for facilitating configuration of a secure storage device, the method comprising:
  prior to determining whether the secure storage device is in a configuration-ready mode, setting the secure storage device into the configuration-ready mode, wherein setting the secure storage device into the configuration-ready mode comprises:
  setting an encryption key into the secure storage device,
  wherein when the secure storage device contains data stored prior to setting the encryption key, the encryption key is unusable for decrypting the data stored prior to setting the encryption key;
  determining whether the secure storage device is in a configuration-ready mode, the configuration-ready mode indicating that the secure storage device is allowed to communicate with a host, which is external to the secure storage device, to configure the secure storage device; and
  receiving configuration data from the host for configuring the secure storage device when the secure storage device is determined to be in the configuration-ready mode, wherein the secure storage device is prevented from receiving the configuration data from the host when the secure storage device is determined to be not in the configuration-ready mode.

17. The method of claim 16, wherein prior to receiving the configuration data from the host, when the secure storage device is in the configuration-ready mode and contains a security identification code, the security identification code contained in the secure storage device is a null security identification code that is unusable to facilitate unlocking the secure storage device after the secure storage device is locked.

18. The method of claim 16, wherein prior to receiving the configuration data from the host, when the secure storage device is in the configuration-ready mode and contains a security identification code, the security identification code contained in the secure storage device is a null security identification code that is unusable to facilitate operation of the secure storage device after the secure storage device is locked,
  wherein the secure storage device comprises: a housing; a memory disposed within the housing and configured to store secure data; a physical input device disposed at an outer surface of the housing; and a controller disposed within the housing and coupled to the memory.

19. A method for facilitating configuration of a secure storage device, the method comprising:
  determining whether the secure storage device is in a configuration-ready mode, the configuration-ready mode indicating that the secure storage device is allowed to communicate with a host, which is external to the secure storage device, to configure the secure storage device,
  wherein when the secure storage device is in the configuration-ready mode, the method further comprises:
    facilitating establishment of a configuration encryption key for configuration data;
    receiving the configuration data from the host for configuring the secure storage device;
    decrypting the configuration data based on the configuration encryption key;
    storing the configuration data in the secure storage device; and
    setting the secure storage device into a non-configuration-ready mode,
  wherein the configuration encryption key is different from a data transfer encryption key for encrypting data to a memory of the secure storage device or decrypting data from the memory, and
  wherein the secure storage device is prevented from receiving the configuration data from the host when the secure storage device is not in the configuration-ready mode.

20. The method of claim 19, wherein when the secure storage device is set to a second configuration-ready mode after the non-configuration-ready mode, the secure storage device is configured to use a second configuration encryption key that is different from the configuration encryption key.

* * * * *